United States Patent [19]
Leonard

[11] Patent Number: 5,654,899
[45] Date of Patent: Aug. 5, 1997

[54] RADIATION INSTRUMENT AND METHOD TO MEASURE RADON AND THORON CONCENTRATION, AIR CHANGE RATE AND SOURCE EMANATION RATE MAGNITUDES

[76] Inventor: Bobby E. Leonard, International Academy Of Hi-Tech Services, Inc. 1244 Ritchie Hwy. Suite 6, Arnold, Md. 21012

[21] Appl. No.: 130,853

[22] Filed: Oct. 4, 1993

[51] Int. Cl.$^6$ ............................................... E06B 5/18
[52] U.S. Cl. ............................................... 364/500; 454/99
[58] Field of Search ....................... 364/500, 526, 364/527, 497, 496, 555, 571.07; 250/370.02, 253, 380; 454/99, 909

[56] References Cited

U.S. PATENT DOCUMENTS

| | | | |
|---|---|---|---|
| 4,638,443 | 1/1987 | Kaneyasu et al. | 364/497 |
| 4,700,070 | 10/1987 | Kovac | 250/253 |
| 4,800,272 | 1/1989 | Harley et al. | 250/253 |
| 4,812,648 | 3/1989 | Perlman | 250/253 |
| 4,814,608 | 3/1989 | Dempsey et al. | 250/253 |
| 4,983,843 | 1/1991 | Thomson | 250/370.02 |
| 5,026,986 | 6/1991 | Hurst | 250/370.02 |
| 5,029,248 | 7/1991 | Miyake | 250/253 |
| 5,124,936 | 6/1992 | Pelletier et al. | 364/527 |
| 5,319,208 | 6/1994 | Diamondis | 364/526 |

OTHER PUBLICATIONS

"Ventilation Rates by Direct Measurement of Radon Time–Dependent Bahavior", author Bobby E. Leonard, Jun. 2–6, 1991, Transactions of the American Nuclear Societ, Orlando Fl, vol. 63, pp. 376–377.

*Primary Examiner*—Emanuel T. Voeltz
*Assistant Examiner*—Thomas Peeso
*Attorney, Agent, or Firm*—Vorys, Sater, Seymour & Pease

[57] ABSTRACT

A ventilation, radon and thoron detection system and method is provided. The natural air ventilation rate of a closed space is determined by causing the purging of a closed space, to expel most of the equilibrium radon gas. The gradual buildup of the radon to equilibrium levels is closely monitored via an electronically controlled alpha detector. A one-to-one correspondence between the rate of return buildup of radon to the ventilation rate of the space is established. Empirically measured values of radon accumulation after purge are compared to stored tables of theoretical values. Adjustments may be made to account for residual radon after purge.

8 Claims, 15 Drawing Sheets

EFFECT OF CONCENTRATION MAGNITUDE FLUCTUATION
DURING DATA SAMPLE TIME

| (1) | (2) | (3) | (5) | |
|---|---|---|---|---|
| | FOR CT. RATE DATA - (154 HOURLY CT.) | | FOR INTEGRAL DATA $St - St(1 + at/2)$ | |
| SAMPLE TIME (h) | PERCENT SIGMA (%) | REJECTS ABOVE 30% (%) | PERCENT SIGMA (%) | REJECTS ABOVE 30% (%) |
| 1 | 6.3 | 0 | 4.2 | 0 |
| 2 | 11.1 | 0 | 5.6 | 0 |
| 3 | 14.3 | 3.5 | 7.2 | 1.8 |
| 4 | 24.1 | 16.7 | 12.1 | 9.4 |
| 5 | 27.3 | 26.1 | 13.7 | 13.1 |

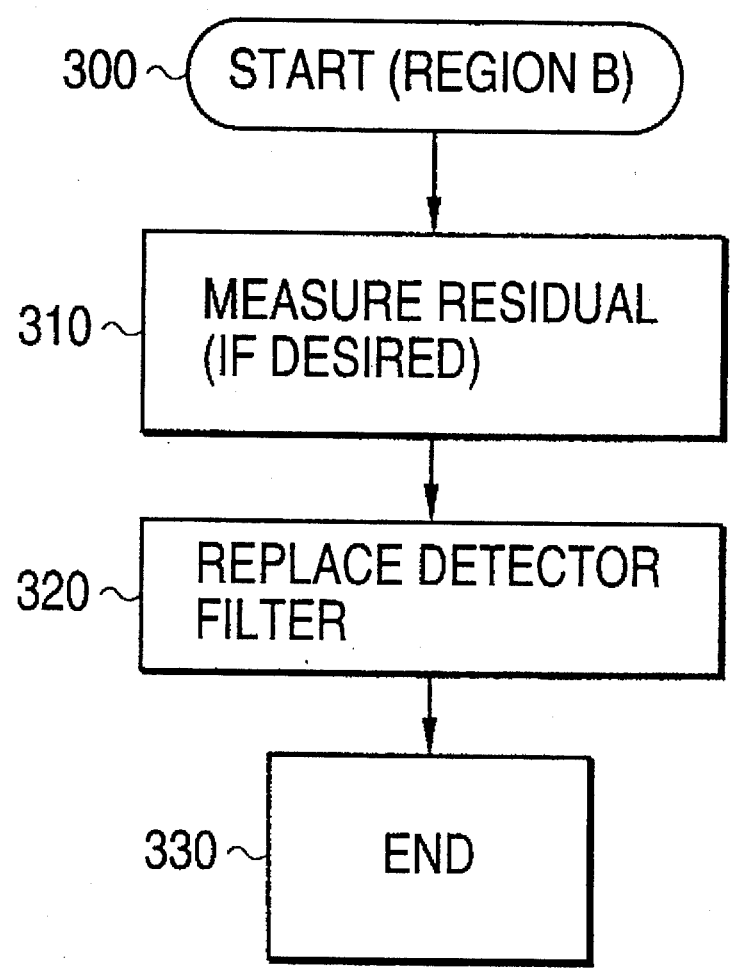

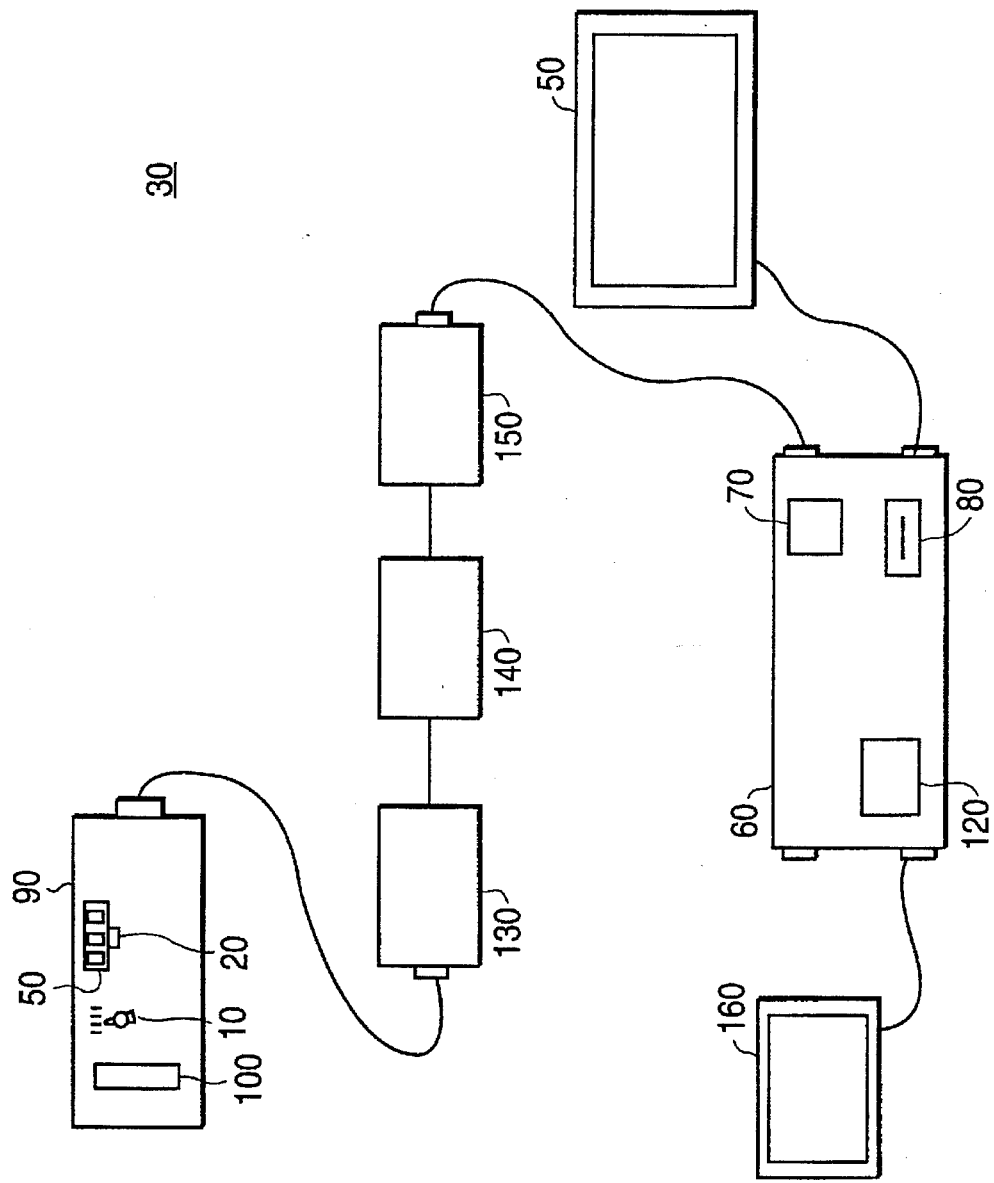

FIG. 6(A)

| A. CONSTANT FORCED ACHR, NATURAL SOURCE UNDERGROUND CHAMBER | | | | | |
|---|---|---|---|---|---|
| Mechanical Ventilation Chamber Volume = 43.65m3 | | | | | |
| Chamber Underground Surface Area = 83.4 m2 | | | | | |
| | | | | | |
| | SNIFFER DATA | | | ANEMOMETER DATA | |
| (1) | (2) | (3) | (4) | (5) | (6) |
| RUN NO. | COUNT RATE | SNIFFER ACH | SNIFFER %S.D. | ACH | Forced V %S.D. |
| | Cph | h-1 | | h-1 | |
| | | | | | |
| F-1 | 1456 | 0.205 | 54.1 | 0.157 | 2 |
| F-2 | 3840 | 0.345 | 13.4 | 0.291 | 2 |
| F-3 | 9600 | 0.035 | 6.3 | 0.033 | 2 |
| F-4 | 1452 | 0.354 | 8.1 | 0.357 | 2 |
| F-5 | 13500 | 0.067 | 23.8 | 0.075 | 2 |
| F-6 | 6600 | 0.161 | 42.9 | 0.177 | 2 |
| F-7 | 61050 | 0.00018 | 12.4 | 0.000 | 2 |
| F-8 | 63010 | 0.104 | 3.5 | 0.101 | 2 |
| | | | | | |
| Net % Standard Deviation= | | | 26.8 | | 2 |
| | | | | | |
| B. CONSTANT SOURCE TEST ROOM | | | | | |
| | | | | | |
| NIST Calibrated Ra226 Source = 37.0kBq. | | | | | |
| Underground Surface Area = 0.0 m2, | | | | | |
| Room Volume = 34.85 m3 | | | | | |
| | CAM DATA | | | SF6 DATA | |
| (1) | (2) | (3) | (4) | (5) | (6) |
| RUN NO. | COUNT RATE | CAM ACH | CAM %S.D. | SF6 ACH | SF6 %S.D. |
| | Cph | h-1 | | h-1 | |
| | | | | | |
| A-1 | 6287 | 0.119 | 12.1 | 0.118 | 25.2 |
| A-2 | 2923 | 0.251 | 22.8 | 0.244 | 24.6 |
| A-3 | 3045 | 0.221 | 12.5 | 0.205 | 8.3 |
| | | | | | |
| Net % Standard Deviation = | | | 16.5 | | 20.9 |

*From FIG. 6(A)*

| RESIDENTIAL MEASUREMENTS | | | | | |
|---|---|---|---|---|---|
| (1) | (2) | (3) | (4) | (5) | (6) |
| Natural Source, Natural Ventilation | | | | | |
| | CAM DATA | | | SF6 DATA | |
| RUN NO | COUNT RATE Cph | CAM ACH h-1 | CAM %S.D. | SF6 ACH h-1 | SF6 %S.D. |
| | | | | | |
| C. HOUSE D - Volume = 285.55 m3, | | | | | |
| Underground Surface Area = 205.2 m2 | | | | | |
| D-1 | 19872 | 0.213 | 22.1 | 0.202 | 12.2 |
| D-2 | 4022 | 0.252 | 3.9 | 0.289 | 9.2 |
| | | | | | |
| D. HOUSE T - Volume = 110.14 m3, | | | | | |
| Underground Surface Area = 101.1 m2 | | | | | |
| T-1 | 240 | 0.175 | 18.7 | 0.142 | 14.7 |
| T-2 | 3855 | 0.197 | 8.6 | 0.262 | 39.8 |
| | | | | | |
| E. HOUSE S - Volume = 203.97 m3, | | | | | |
| Underground Surface Area = 124.5 m2 | | | | | |
| S-1 | 886 | 0.402 | 24.4 | 0.355 | 17.5 |
| S-2 | 1107 | 0.531 | 7.7 | 0.536 | 12.1 |
| | | | | | |
| F. HOUSE W - Volume = 229.46 m3 | | | | | |
| Underground Surface Area = 83.6 m2 | | | | | |
| W-1 | 586 | 0.571 | 32.4 | 0.461 | 59.5 |
| W-2 | 1050 | 0.447 | 34.3 | 0.748 | 24.6 |
| W-3 | 802 | 1.031 | 23.8 | 0.992 | 17.4 |
| W-4 | 440 | 1.329 | 92.2 | 1.118 | 96.9 |
| W-5 | 961 | 1.643 | 15.7 | 1.664 | 13.9 |
| W-6 | 1358 | 1.161 | 10.5 | 1.036 | 10.3 |
| W-7 | 1000 | 1.169 | 20.6 | 1.032 | 21.1 |
| W-8 | 145 | 1.552 | 15.6 | 2.166 | 29.6 |
| W-9 | 330 | 2.741 | 3.2 | 2.851 | 7.1 |
| W-10 | 525 | 1.383 | 27.9 | 1.349 | 30.9 |
| W-11 | 325 | 1.255 | 28.1 | 1.293 | 10.7 |
| | | | | | |
| Net % Standard De | = | | 31.1 | | 34.5 |
| With-out Run No.F- | = | | 21.6 | | 23.6 |

*From FIG. 6(A)*

RADIATION INSTRUMENT AND METHOD TO MEASURE RADON AND THORON CONCENTRATION, AIR CHANGE RATE AND SOURCE EMANATION RATE MAGNITUDES

BACKGROUND OF THE INVENTION

1. Field of the Invention

The invention generally relates to a method and apparatus for determining the radiation concentration level, air change rate and radiation source emanation magnitude for Radon (Rn-222) and Thoron (Rn-220) and their progenies in closed spaces.

2. Brief Description of Prior Art

In regions around the world, radon and thoron are present in buildings at concentration levels sufficient to be hazardous to the general health of building occupants. As is well known, radon and thoron seep up naturally from underground deposits in the form of a gas. The U.S. Environmental Protection Agency (EPA) has set out standards for permissible concentration levels of those gases, due to danger of lung cancer and other adverse health effects. Generally speaking, the concentration of radon gas (for instance) in a building is a function of the natural emanation or source rate, and the ventilation (or air change) rate in that building.

However, no single instrument is readily available to conveniently and concurrently determine the concentration, air themselves. If a high concentration is observed, the EPA recommends that the concentration be reduced below EPA standards.

To measure the radon or thoron concentration itself, an example of a system for measuring the concentration level is Radon "Sniffer", Model TN-WL-01, made by Thomson-Nielsen Electronics, Ltd. of Ontario, Canada. That system is a portable electronic device which forces ambient air through a filter, extracting the solid progenies of radon and thoron. The filter is situated adjacent to a silicon-based alpha particle radiation detector which counts the alpha particles emitted from the filter that impinge on the detector surface. With proper calibration and knowledge of air flow rate, the concentration of the progenies in air can be manually calculated.

Another filtered apparatus like that described above is the Alpha CAM Model 758, made by Victoreen, Inc. of Cleveland, Ohio. That patent describes an apparatus which measures airflow rate through the filter, and automatically computes the airborne radiation concentration in units of pico-Curies per liter of air.

Once an undesirable radon concentration is detected by devices like those reflected in the above patents or otherwise, reduction is needed. One way to reduce radon concentration is to increase the air dilution rate in the subject space by increasing the mixing with or ventilation to outside, lower-radiation air, if at all economical. This can only be evaluated by knowing the current ventilation or air change rate (ACH, units of $h^{-1}$). Concentration may also be reduced by inducing a positive pressure differential between the space and the Rn source, if ventilation rate is known. EPA Report 625/5-87/019, entitled "Radon Reduction Technique for Detached Houses" (incorporated here by reference) in fact indicates that the single most effective measure a homeowner can take to reduce radon concentration is to increase the ventilation rate.

The EPA Report further cites measurement of house ventilation rate as a diagnostic to help select radon reduction techniques. Even so, an informal survey of Rn testing/mitigation firms in the state of Maryland (involving 90% of licensed firms) found that only two firms had the capability, in-house, to measure ventilation rates.

The current standard method for determining ventilation or air change rate in a building space is to inject a tracer gas, typically $SF_6$ (ethane may also be used) into the space. The decrease in the $SF_6$ concentration with time as ventilation carries the $SF_6$ away is monitored with a tracer gas monitoring instrument. One such instrument is the Leak Meter Model 61, manufactured by Ion Track Instruments, Inc. of Wilmington, Mass. However, this instrument requires ancillary equipment including high pressure tanks of argon and $SF_6$ gas, which altogether is cumbersome and not easily handled in the field.

Besides increasing ventilation, a second way to reduce the radon concentration level below EPA-recommended limits is to reduce the radiation source (emanation) rate into the space by modifying the building itself, to seal off or reduce radon and thoron entry pathways. This usually involves expensive physical revisions to the building. Therefore, to establish whether the option of reducing the source rate magnitude is preferable to the option of increasing the air change rate in the space, it is necessary to determine both the air change rate and the radiation source rate magnitudes.

But again, no single apparatus is available that can measure the airborne radon (or thoron) concentration level, and simultaneously determine the air change rate and the source rate magnitude. Moreover, no single instrument can determine just the radiation source rate magnitude.

Thus, there is a technical need for a radon and thoron radiation monitoring instrument that can also measure the air change rate, and determine the radiation source rate magnitude. There is also a need for an instrument that is compact, portable, easy to transport to and operate at field testing sites.

SUMMARY OF THE INVENTION

It is accordingly an object of the invention to provide a method and apparatus for measuring the airborne radiation concentrations of radon and thoron and their progenies in closed spaces.

It is another object of the invention to provide a method of measuring the air change rate in building spaces.

It is another object of the invention to provide a method to determine the radiation emanation source rate in building spaces.

It is another object of the invention to provide a method to determine the degree of accuracy in the measurement of the radon and thoron and their progenies, the air change rate and the radiation source emanation rate.

It is another object of the invention to provide an instrument that and may be easily transported to and operated at building field locations by one person.

It is another object of the invention to provide an instrument that is reliable yet relatively inexpensive to manufacture.

It is another object of the invention to provide an instrument to perform the prescribed measuring without requiring heavy electrical power, optionally running off of compact batteries in the instrument.

The invention achieving these and other objects is an accurate, easily-operated detection system and method including a compact radiation detector unit with alpha-capturing filter, a micro-computer for control and recording of data, signal conditioning circuits, digital and graphical readout capability, indicator lights, and other structure and steps. The inventor has taken pains to ensure that the detection system and method of the invention is both well-grounded theoretically, and yet experimentally convenient.

BRIEF DESCRIPTION OF THE DRAWINGS

The invention will be described with reference to the following drawings, in which like numbers denote like parts.

FIGS. 2(a), 2(b) and 2(c) illustrate a flowchart of the method of detection of the invention;

FIG. 3 illustrates a schematic diagram of the detection system of the invention;

FIGS. 6(A) and 6(B) illustrate experimental results from applying the detection system and method of the invention to several test sites;

DETAILED DESCRIPTION OF THE DRAWINGS

The detector method and system of the invention generally involves the operating of a radiation detector system 30 under controlled conditions of air purging followed by radon re-accumulation in the subject space. As illustrated in FIG. 3, the detector system 30 generally comprises a microcomputer 60 for carrying out programmed control and recording of radon (or thoron) concentration measurement. Detector system 30 likewise generally comprises a detector unit 90 for the detection of radon concentration. Detector unit 90 may for instance be suitably implemented by an Alpha CAM Model 758, manufactured by Victoreen, Inc. That detector unit employs a solid state silicon detector for alpha particle detection. Other commercial detector devices are available, as will be appreciated by persons skilled in the art.

Figures 1, 10:
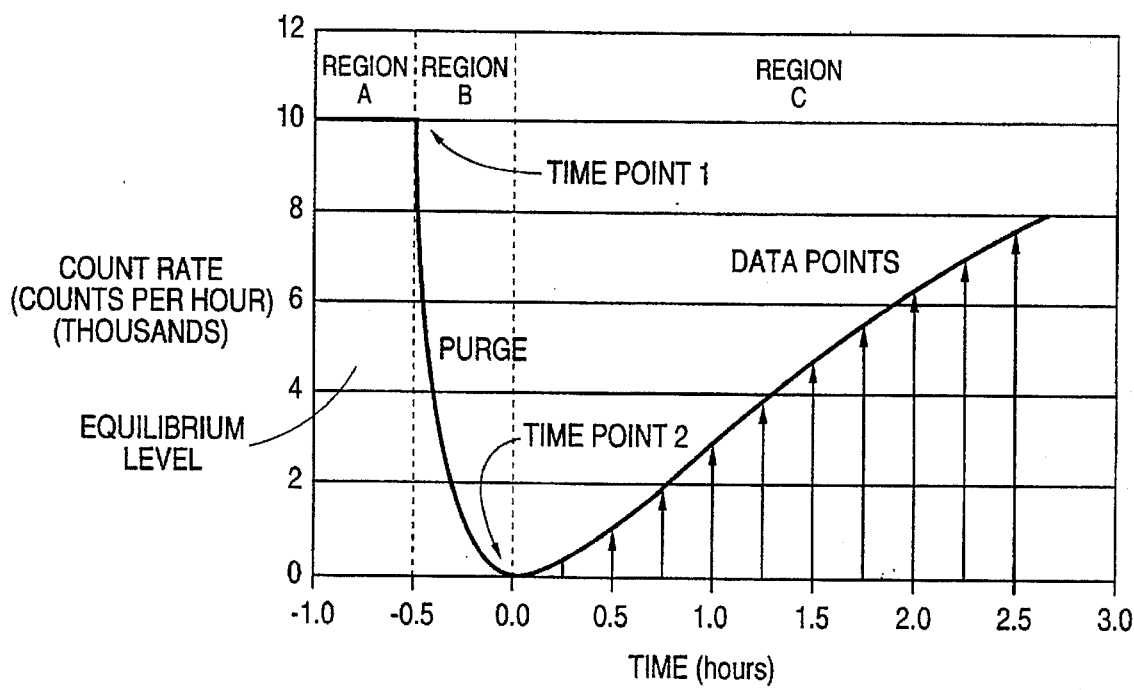
FIG. 1 illustrates a measuring sequence in three time periods according to the invention.
FIG. 10 illustrates a table showing the effect of variation in source rate magnitude on measurements made by the invention.

The overall approach of detector system 30 is to use the detector system 30 to monitor the radon concentration levels in a building space in three time regions. FIG. 1 illustrates the three time regions.

The time regions are defined by the following conditions: Region A—where the Radon and Thoron and progenies are in radioactive equilibrium with each other in the building air space, as predicted by Equation 5; Region B—where the building air space is mechanically purged; and Region C—where the detector system monitors the gradual return of the concentration level to the air space.

The conditions of air purging followed by radon re-accumulation in the subject space in time regions A, B and C are generally controlled as follows, giving consideration to the nature of the radon source phenomena and its transport in closed spaces.

The basic starting relation: C~S/Lambda, is a simplified stationary, equilibrium, result from the Bateman equations. (See H. Bateman, "The Solution of Samplings of Differential Equations Arising in the Theory of Radioactive Transformation," Proceedings of Cambridge Philosophical Society, Vol. 15, p. 423, 1908; also Appendix). The equations have been examined extensively for series of radio-isotopes. (See R. D. Evans, "The Atomic Nucleus," McGraw Hill Book company, Inc., New York, 1955). The equations have also applied them to time dependent Rn-222, and Rn-220 and their progenies behavior in underground mines. (See R. D. Evans, "Engineers Guide to the Elementary Behavior of Radon Daughters," Health Physics Journal, Vol. 17, p. 229, 1969; J. Bigu, "Theoretical Models for Determining Rn$^{222}$ and Rn$^{220}$ Progeny Levels in Canadian Underground U Mines—A Comparison with Experimental Data," Health Physics Journal, Vol. 48, No. 4, p. 371, 1985). The following is a general treatment of the Bateman and related equations.

Solution of Time-Dependent Equations for Airborne Concentrations and/Activity on a Filter Detector Airborne Concentrations of Rn-222 and Progenies The Bateman differential equations for the concentrations of Rn-222 and its progenies can be given in the following form:

$$\dot{C}_1(t) = -\lambda_1 C_1(t) + S_1 \text{ for Rn-222} \quad (A1)$$

$$\dot{C}_2(t) = -\lambda_2 C_2(t) + S_2 + \lambda_{1r} C_1(t) \text{ for Ra-A} \quad (A2)$$

$$\dot{C}_3(t) = -\lambda_3 C_3(t) + S_3 + \lambda_{2r} C_2(t) \text{ for Ra-B} \quad (A3)$$

$$\dot{C}_4(t) = -\lambda_4 C_4(t) + S_4 + \lambda_{3r} C_3(t) \text{ for Ra-C/C'} \quad (A4)$$

where

1. Since the half life for Ra-C, 0.16 msec., is so short in the decay to Ra-C' we assume that the concentration of Ra-C and Ra-C' are the same, and we shall refer to them as Ra-C/C'.

2. $C_1$, $C_2$, $C_3$, and $C_4$ are the airborne concentrations of Rn-222, Ra-A, Ra-B, and Ra-C/C', respectively in units of atoms m$^{-3}$; i.e., $C_i = N_i/V$ with $N_i$ is number of atoms in volume V for i-th isotope.

3. $\lambda_{1r}$, $\lambda_{2r}$, $\lambda_{3r}$, and $\lambda_{4r}$ are the removal rates from radioactive decay for Rn-222 (0.00755 h$^{-1}$), Ra-A (13.63 h$^{-1}$), Ra-B (1.551 h$^{-1}$) and Ra-C/C' (2.111 h$^{-1}$), respectively;

4. $\lambda_1$, $\lambda_2$, $\lambda_3$, and $\lambda_4$ are the net removal rates, from all processes including radioactive decay and air change in the space under consideration for Rn-222, Ra-A, Ra-B, and Ra-C/C', respectively, in units of h$^{-1}$. These $\lambda$'s are assumed to be constant during the time period under examination;

5. $S_1$, $S_2$, $S_3$, and $S_4$, are the emanation rates per unit volume into the space for Rn-222, Ra-A, Ra-B, and Ra-C/C', respectively in units of atoms m$^{-3}$h$^{-1}$. These Ss are assumed to be constant during the time period under examination;

6. t=time in units of hours.

7. The initial conditions on the solutions to the differential equations (A1), (A2), (A3) and (A4) at t=0 are that $C_1(o)=C_2(o)=C_3(o)=C_4(o)=0$.

The solutions to equations (A1), (A2), (A3) and (A4) can be expressed in a generalized form $$C_k(t) = \sum_{n=1}^{k} [S_n/\lambda_k] \cdot \left[ \prod_{i=n}^{k-1} (\lambda_k/\lambda_i) \right] \cdot \left[ 1 - \sum_{\beta=n}^{k} h_{n/k,\beta} \cdot \text{Exp}(-\lambda_\beta t) \right] \quad (A5)$$

where $$h_{n/k,\beta} = [\lambda_n/(\lambda_n - \lambda_\beta)] \cdot [\lambda_{n+1}/(\lambda_{n+1} - \lambda_\beta)] \ldots [\lambda_k/(\lambda_k - \lambda_\beta)] \quad (A6)$$

(following similar notation of Evans) and k=1, 2, 3 and 4 for Rn-222, Ra-A, Ra-B, and Ra-C/C', respectively.

Activity Collected on a Filter Detector

The differential equations for the activities of the particulate progenies on a filter by the flow of adjacent ambient air through the filter can be given by:

$$\dot{N}_2(t) = -\lambda_2 N_2(t) + E_f V_f C_2(t) \text{ For Ra-A} \quad (A7)$$

$$\dot{N}_3(t) = -\lambda_3 N_3(t) + E_f V_f C_3(t) + \lambda_2 N_2(t) \text{ For Ra-B} \quad (A8)$$

$$\dot{N}_4(t) = -\lambda_4 N_4(t) + E_f V_f C_4(t) + \lambda_3 N_3(t) \text{ For Ra-C/C'} \quad (A9)$$

where

1. $N_{2f}$, $N_{3f}$, and $N_{4f}$ are the number of atoms on the filter for Ra-A, Ra-B, and Ra-C/C', respectively.
2. $E_f$ is the filter collection efficiency in units of fraction of atoms retained on filter per atom entering the filter. $E_f$ is assumed to be constant during the time period under examination.
3. $V_f$ is the volume flow rate through the filter in units of $m^3 h^{-1}$. $V_f$ is assumed to be constant during the time period under examination.
4. The initial conditions on the solutions to the differential equations (A7), (A8), and (A9) at t=0 are that $A_{2f}(o)=A_{3f}(o)=A_{4f}(o)=0$.

As can be seen by equation (A7), for Ra-A only one means of deposition on a filter is possible, i.e. from the filtering out of Ra-A particulate from the ambient air surrounding the filter system since its precursor, Rn-222, is an inert gas.

As in the case presented by Evans, there are two pathways by which the activity of the other three particulate isotopes, Ra-B, Ra-C and Ra-C' can be produced on a filter. They may be deposited directly from the air, but also, they may be produced on the filter by the radioactive decay of atoms of the immediately adjacent precursor isotope that are already collected on the filter. For example, we will have the growth of Ra-B from the decay of Ra-A already on the filter. The case is true for Ra-C/C', also, by decay of Ra-B. We shall therefore let $\lambda_f N_{kf}(t) = A_{kf}(t)$ such that $$A_{kf}(t) = A_{kgf}(t) + A_{kaf} \quad (A10)$$

where $A_{kf}$ = the total activity of the k-th isotope on a filter (in units of Bq);

$A_{kgf}$ = the activity of the k-th isotope on the filter from the growth by decay of the adjacent precursor on the filter (Bq);

$A_{kaf}$ = the activity of the k-th isotope on the filter from the direct collection of the airborne activity of this k-th isotope (Bq).

From (A10) above, the two components representing the two pathways can be separated as differential equations, i.e., $$A_{kf}(t) = A_{kgf}(t) + A_{kaf}(t) \quad (A11)$$

where $$\dot{A}_{kgf}(t) = -\lambda_k A_{kgf}(t) + \lambda_{k-1} A_{k-1,f}(t) \quad (A12)$$

and $$\dot{A}_{kaf}(t) = E_f V_f C_k(t) - \lambda_k A_{kaf}(t) \quad (A13)$$

for k=2, 3 and 4 for Ra-A, Ra-B and Ra-C/C', respectively.

Pathway Components

Figure 11:
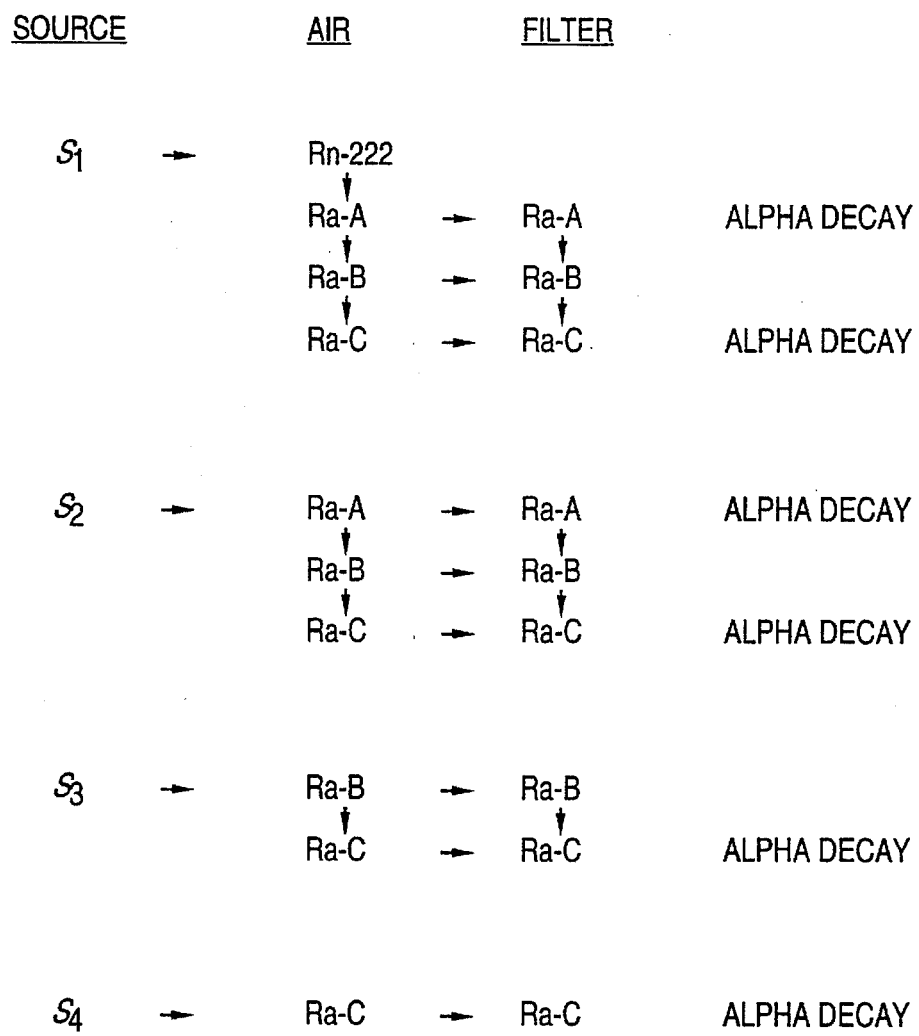
FIG. 11 illustrates a schematic diagram of alpha particle generation by radon progenies.
Figure 12B:
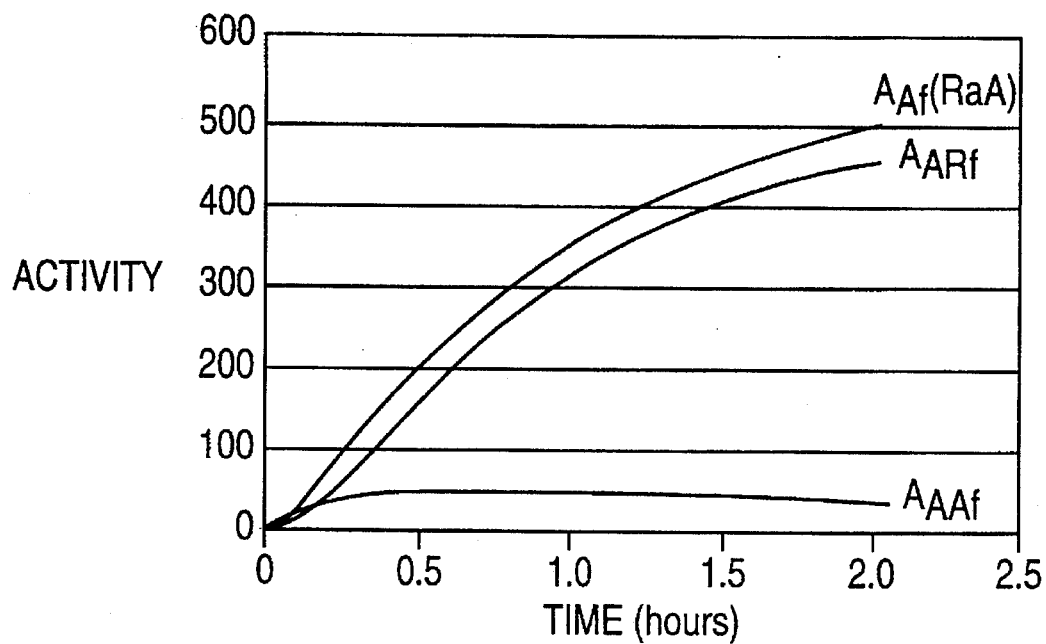
Figure 12C:
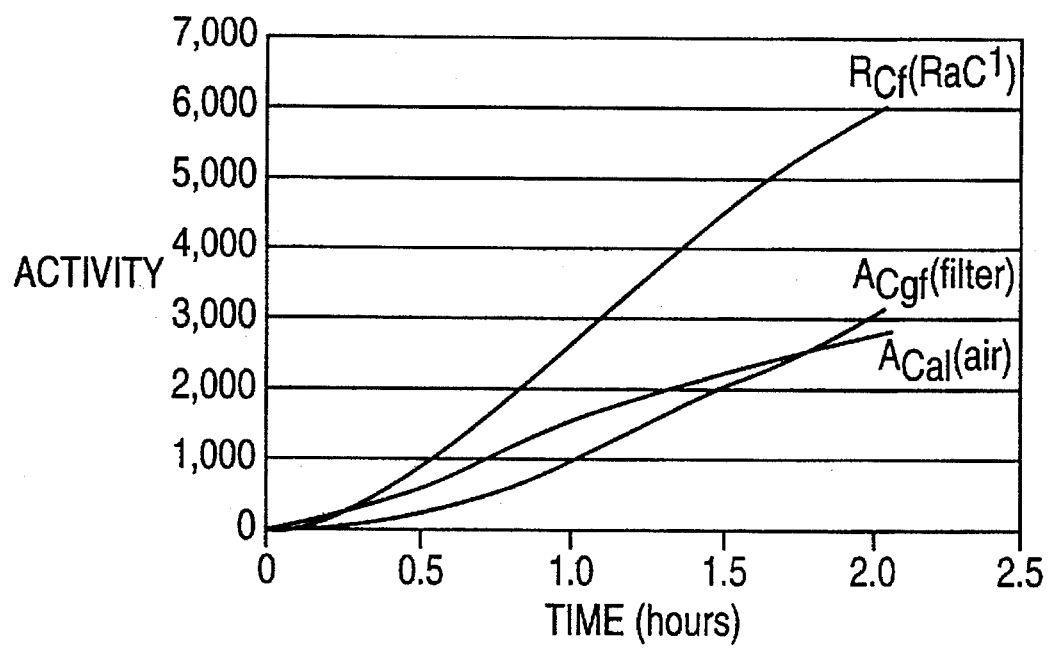
Figure 12D:
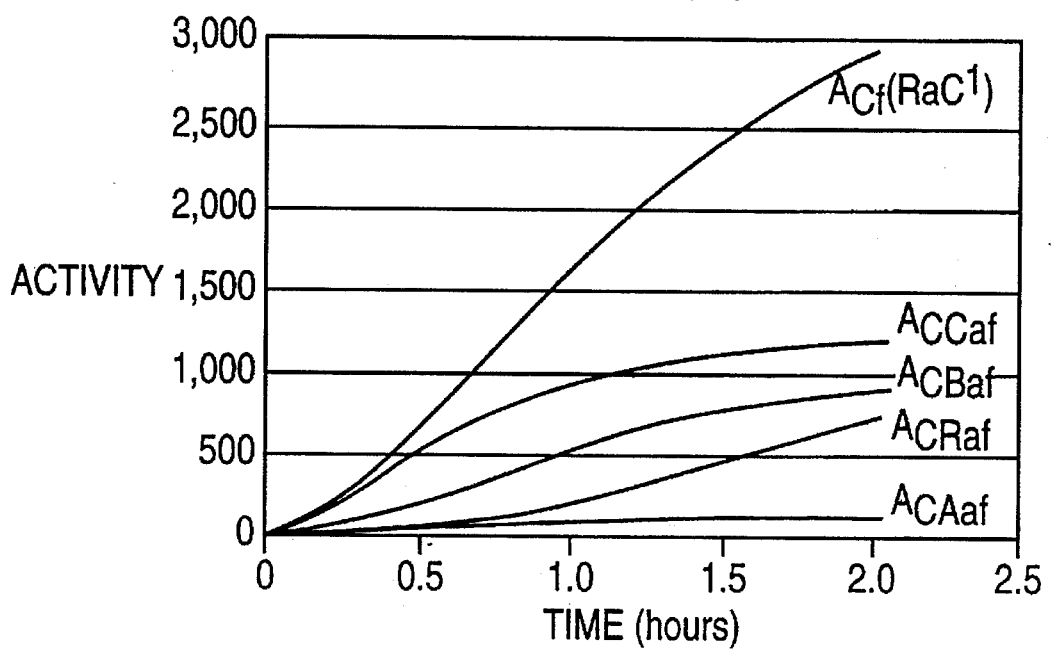
Figure 12E:
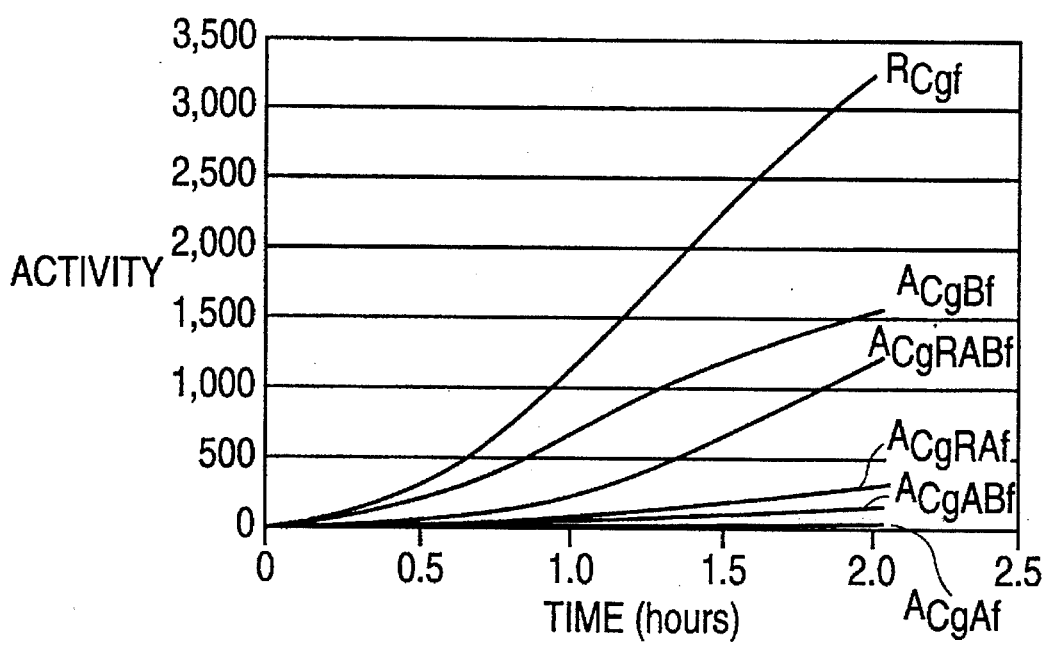

We have explicitly defined the various pathway components and graphically depict them in FIG. 11. FIG. 12 provides the time dependent behavior of each component for an equilibrium total activity of 10,000 disintegrations per minute. In FIG. 12 the indices are R for Rn and indices 1, A for Ra-A and indices 2, B for Ra-B and indices 3, and C for Ra-C/C' and indices 4.

I. $A_f$—Total alpha filter activity, consists of all alpha activities from both Ra-A and Ra-C'. $A_f = A_{2f} + A_{4f}$ (See FIG. (12(a)).

A. $A_{2f}$—Total Filter Activity from Ra-A, consists of two components, $A_{22f}$ and $A_{21f}$. $A_{2f} = A_{22af} + A_{21af}$ (See FIG. (12(b)).

1. $A_{22af}$—Filter activity from Ra-A emanating into the space as $S_2$ and being collected on the filter.
2. $A_{21af}$—Filter activity from Rn-222 emanating into the space as $S_1$, decaying to Ra-A in air and then being collected on the filter.

B. $A_{4f}$—Total alpha filter activity from Ra-C/C'. This consists of alpha activities from Ra-C/C' collected directly from the air ($A_{4af}$) and Ra-C that is produced by the decay of precursors that themselves have been earlier collected on the filter before decaying to Ra-C ($A_{4gf}$). $A_{4f} = A_{4af} + A_{4gf}$. See FIG. (12(c)).

1. $A_{4af}$—Ra-C/C' activity collected on the filter as Ra-C/C' directly from the air. $A_{4af} = A_{44af} + A_{43af} + A_{42af} + A_{41af}$ which consists of all the activities from all of the emanating sources, $S_1, S_2, S_3$ and $S_4$, whose isotopes and their progenies have remained airborne until decay to Ra-C before being collected on the filter. See FIG. (12(d)) for components and Equation (A14).

a. $A_{44af}$—Activity that emanated from the source as $S_4$ and was collected on the filter; n=4, k=4.
   b. $A_{43af}$—Ra-B activity that emanated from the source as $S_3$ and decayed in air to Ra-C and was then collected on the filter; n=3, k=4.
   c. $A_{42af}$—Ra-A activity that emanated from the source origin as $S_2$ and decayed to both Ra-B and Ra-C in air before being collected on the filter as Ra-C; n=2, k=4.
   d. $A_{41af}$—Rn-222 activity that emanated as $S_1$ and decayed, to Ra-A, Ra-B and Ra-C in air and then being collected on the filter as Ra-C; n=1, k=4.

2. $A_{4g1f}$—The Ra-C/C' activity that was acquired on the filter from the radioactive decay of the precursors of Ra-C, with these precursors being deposited on the filter prior to their subsequent decay to Ra-C. This includes those that experience pad of their decay sequence in air, for example Ra-A→Ra-B in air and Ra-B then collected on the filter, prior to decay to Ra-C. This includes five components, i.e. $A_{4gf} = A_{4g3f} + A_{4g2f} + A_{4g23f} + A_{4g12f} + A_{4g123f}$. See FIG. (12(e)).

a. $A_{4g3f}$—Ra-B activity emanating as $S_3$ and being collected directly onto the filter as Ra-B prior to decay to Ra-C. This would be the term in equation (A15) for n=3 (Ra-B); j=3, k=4.

b. $A_{4g2f}$—Ra-A activity emanating as $S_2$ and being collected directly onto the filter as Ra-A prior to decaying to Ra-B and Ra-C on the filter. This would be part of the term in equation (A15) for n=2 (Ra-A); j=2, k=4.

c. $A_{4g23f}$—Ra-A activity emanmating from the source origin as $S_2$, but decaying to Ra-B in air prior to being collected on the filter as Ra-B, which then decays to Ra-C on the filter. This would be part of the term in equation (A15) for n=2 (Ra-A); j=3, k=4.

d. $A_{4og12f}$—Rn-222 activity emanating from the source as $S_1$, and decaying to the particulate, Ra-A, before it is collected on the filter. It then decays to Ra-B and Ra-C on the filter. See the term for n=1 (Rn-222) in equation (A15); j=2, k=4.

e. $A_{4g123f}$—This is the activity from Rn-222 emanating from the source as $S_1$ and decaying to both Ra-A and Ra-B in air prior to the collection on the filter as Ra-B, which then decays to Ra-C on the filter. See the term with n=1 (Rn-222) in equation (A15); j=3, k=4.

It is obvious from a brief inspection of the graphs in FIG. 12 that Ra-C is the main contributor to the total activity on the filter and, even further, that even in the components making up the Ra-C activity, i.e. $A_{4af}$ (from air) and $A_{4gf}$ (from growth of Ra-C from precursors on the filter) that Ra-A plays a minor role there, also. This is due to the short half life for Ra-A as compared to Ra-B and Ra-C.

Again, as above for the airborne concentrations (C's), we may write a general form solution for equation (A13)

$$A_{kaf}(t) = E_f V_F \left\{ \sum_{n=1}^{k} [S_n/\lambda_k] \cdot \left[ \prod_{i=n}^{k-1} \lambda_k/\lambda_i \right] \cdot \left[ 1 + \sum_{\beta=n}^{k+1} (-1)^{k-\beta} h_{n/k+1,\beta} \text{Exp}(-\lambda_\beta t) \right] \right\} \quad (A14)$$

For $A_{2af}$ indices for $\alpha$ and $\beta$ in $h_{\alpha\beta}$ are $\alpha,\beta$=1, 2, 2r.
For $A_{3af}$ indices for $\alpha$ and $\beta$ in $h_{\alpha\beta}$ are $\alpha,\beta$=1, 2, 3, 3r.
For $A_{4af}$ indices for $\alpha$ and $\beta$ in $h_{\alpha\beta}$ are $\alpha,\beta$=1, 2, 3, 4, 4r.

Equation (A14) generates all of the individual progeny alpha activities directly from airborne activities deposited directly onto the filter, i.e., $A_{2af}(A_{22af} \& A_{21af})$ and $A_{4af}$ ($A_{44af}, A_{43af}, A_{42af}, \& A_{41af}$).

For the solution of equation (A12), for the Ra-B atoms collected on the filter decaying to Ra-C/C', we have the following general form $$A_{kgif} = E_f V_f \left\{ \sum_{n=1}^{k} [S_n/\lambda_j] \cdot \left[ \prod_{i=n}^{j-1} \lambda_{ir}/\lambda_i \right] \cdot \left[ 1 + \sum_{\beta=n}^{k+1} (-1)^{k-\beta} h_{n/k+1,\beta} \text{Exp}(-\lambda_B t) \right] \right\} \quad (A15)$$

Equation (A15) generates all of the individual Ra-C/C' alpha activities from the decay of Ra-B precursors of Ra-C/C' from Ra-B atoms collected from the air and deposited on the filter, i.e., $A_{4g3f}, A_{4g23f}, A_{4g123f}$. The indices for $\alpha$ and $\beta$ in h$\alpha\beta$ in (A15) are $\alpha,\beta$=1, 2, 3, 3r, 4r. For this k=4, j=3. Equation (A15) also generates all of the individual Ra-C/C' alpha activities from the decay of Ra-A precursors of Ra-C/C' from Ra-A atoms collected from the air and deposited on the filter as Ra-A and decaying through Ra-B to Ra-C, i.e., $A_{4g12f}$ and $A_{4g2f}$. The indices for $\alpha$ and $\beta$ in h$\alpha\beta$ in this case for (A15) are $\alpha,\beta$=1,2, 2r, 3r, 4r. For this, k=4, j=2.

Asymptotic (Equilibrium) Values and Normalization

It is of interest to provide asymptotic, equilibrium relations for equations (A5), (A14) and (A15) and to examine the possibility of normalization of these equations as well as the integral equations such as (A16). The motive for this normalization is to remove the source magnitudes (S's) from the equations and obtain equations solely dependent upon the removal constants (λ's) which are usually primarily affected by the radioactive decay constants (λ's) and the air change rate of the space. For equations (A5), (A14) and (A15), we let t→∞ and obtain;

$$C_k(\infty) = \sum_{n=1}^{k} [S_n/\lambda_k] \cdot \left[ \prod_{i=n}^{k-1} (\lambda_k/\lambda_i) \right] \quad (A16)$$

$$A_{kaf}(\infty) = E_f V_f \left\{ \sum_{n=1}^{k} [S_n/\lambda_k] \cdot \left[ \prod_{i=n}^{k-1} \lambda_k/\lambda_i \right] \right\} \quad (A17)$$

For Ra-A and Ra-B atoms collected directly from air to produce Ra-C/C' alpha activity on filter:

$$A_{kgif}(\infty) = E_f V_f \left\{ \sum_{n=1}^{k} [S_n/\lambda_j] \cdot \left[ \prod_{i=n}^{j-1} \lambda_{ir}/\lambda_i \right] \right\} \quad (A18)$$

Integral Equations

Since a number of Rn measuring instruments provide integral readout data (i.e. accumulated counts), it would be convenient to acquire the integral of the relations developed above and one way would be by numerical integration of digital data. However, integration of the relations is straightforward. For example, equation (A5) we obtain $$\begin{aligned} I_{ck}(t) &= \int C_k(t) dt \\ &= \sum_{n=1}^{k} [S_n/\lambda_k] \cdot \left[ \prod_{i=n}^{k-1} (\lambda_k/\lambda_i) \right] \cdot \\ &\quad \left\{ t - \sum_{\beta=n}^{k} h_{n/k,\beta} \cdot [1 - \text{Exp}(-\lambda_\beta t)]/\lambda_\beta \right\}. \end{aligned} \quad (A19)$$

$I_k(t)$, as t→∞, thus becomes a linear function of time since $C_k(t)$, as t→∞, approaches its constant equilibrium value of $C_k(\infty)$. FIG. 12 provides curves of normalized count rate ($A_f$) and normalized integral counts ($I_f$) for air change rates as indicated vs time, where $$I_f(t) = \int A_f(t) dt \quad (A20)$$

The equations have likewise been used to derive the stationary solutions for measuring radon source magnitudes in residential buildings. (See W. W. Nazaroff et al., "Radon Transport into a Detached One-Story House with a Basement," Atmospheric Environment, Vol. 19, No. 1, p. 31, 1988; N. V. Nero et al., "Radon Concentrations and Infiltration Rates Measured in Conventional and Energy-Efficient Houses," Health Physics Journal, Vol. 45, No. 8, p. 401, 1983).

Others in the art have used stationary relations in the study of infiltration. For instance, time-dependent radon progenies behavior from a water-borne source have been used to determine residential air change rates. (See C. T. Hess et al., "Variations of Airborne and Waterborne Rn-222 in Houses in Maine," Environmental International, Vol. 8, p. 59, 1982). There, the "spike" of radon resulting from brief use of showers in the houses was monitored and by assuming a correlation of its time-dependent decrease with building air change rate through the Bateman equations, ventilation rates were approximated. Yet other practitioners have obtained indoor ventilation rates from natural Rn-222 burst events using time series plots of the decrease in the Rn-222 concentration, after they occurred spontaneously.

However, the detection system and method of the invention significantly improves on all such past explorations of concentration/ventilation rates by establishing a firm theoretical relationship between build-up after air purge and ventilation rate, and easy, reliable techniques for measuring the necessary variables in the field. In confined spaces, the invention produces an accuracy (typically 10–20%) equal to or better than present conventional methods. The invention moreover can be readily carried out using currently available nuclear radiation detection instruments.

Figure 4A:
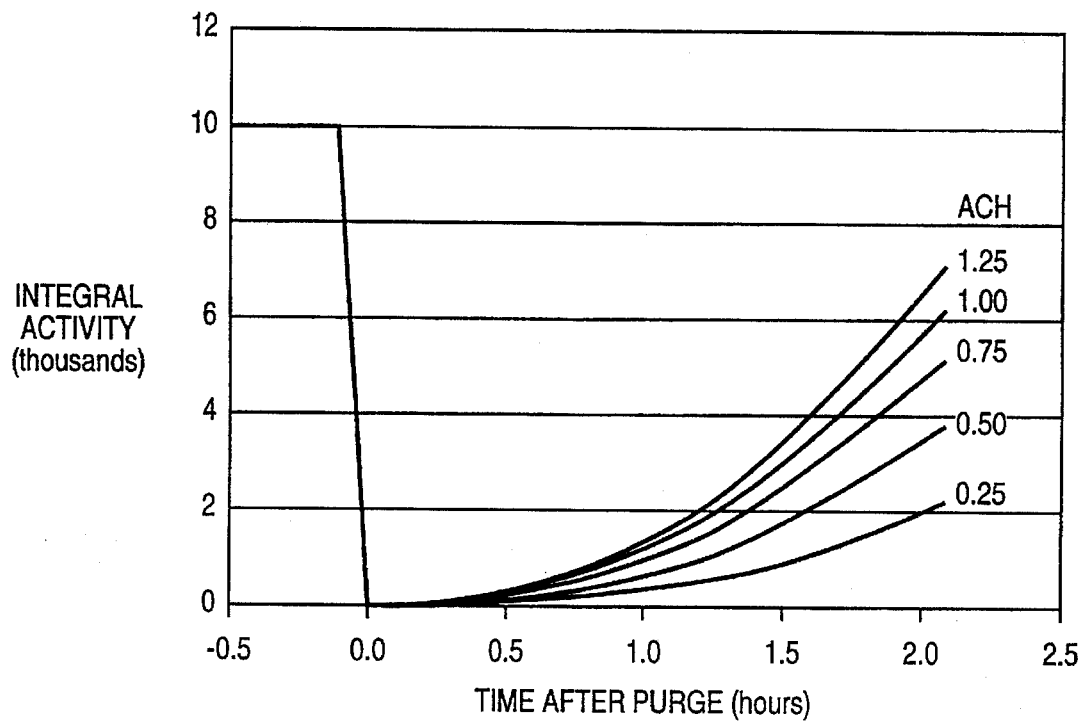
FIGS. 4(A) and 4(B) illustrate theoretical count activity on a filter during the three time periods prescribed by the invention.
Figure 4B:
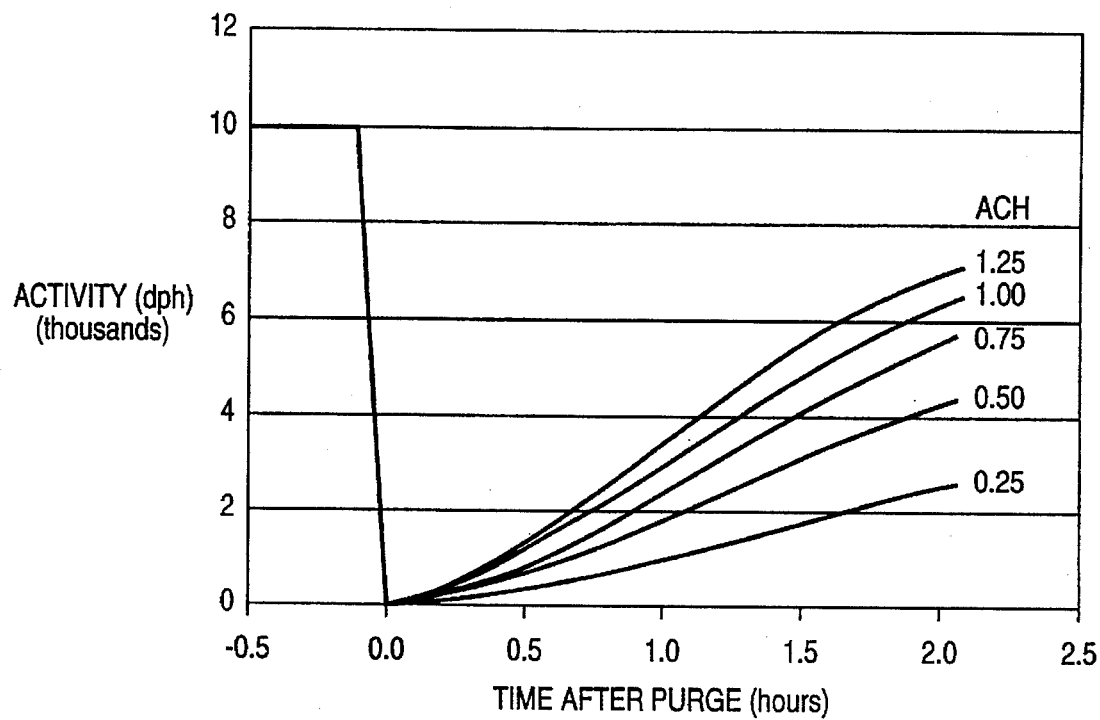

FIG. 4 illustrates the radon and thoron components and their contribution to the time-dependent behavior of alpha detection activity $A_f(t)$, of radon progenies alpha activity on a filter of an air sampling filter detector. (Radon and its daughters will be referred to as just radon when generalities are involved). FIG. 4 illustrates graphs of theoretical $A_f(t)$ and integral activity, $I_f(t)$, curves for five separate air change rates (0.25 $h^{-1}$ intervals) for an equilibrium level of 10,000 disintegrations per hour (shown for time −0.5 to 0 hours). FIG. 1 illustrates a graph for ACH=1.00 $h^{-1}$ and showing the three time Regions, A, B and C. As discussed below, it is necessary to normalize $A_f(t)$ such that $A_f(t)/A_f(t=\infty)$ is independent of the radon and progenies source rate magnitudes. Statistical treatments are known to persons in the art. (See R. D. Evans, "The Atomic Nucleus", op cit.).

The asymptotic, equilibrium relationships shown in Equations 5–8 (and discussed) below must be experimentally determined. Therefore, the stationary radon progenies level must be measured (in Region A) just prior to the purging (in Region B). It is preferable that sufficient counts be obtained in Region A to yield as good a statistical accuracy as possible. It is also preferable to limit the count time to minimize the chance of change in the radon source level.

At time point 1, air purging should begin. Purging may for instance be done using air blowers and portable, flexible, plastic, lightweight ducts. The air blower removal rate should preferably be such that the air volume in the space is exchanged about once every 5 minutes. The air purging should continue for about 30 minutes, providing about 6 air turnovers. Such a purging results in a reduction of radon and progenies levels in the air space by a factor of 64, to less than 2% of the equilibrium level in Region A.

Immediately before air purging is stopped, the filter 100 in the detector unit 90 must be changed. At the moment purging is terminated, and the air pump 110, the detector unit 90 and timer switching device 20 must be started. All conditions in the space should preferably be restored as to exactly what they were in Region A such that the radon and progenies levels will gradually return to equilibrium levels. Time point 2 marks the beginning of Region C, in which the buildup of the radon and progenies emanating back into the space are tracked.

The rate at which the activity builds back up to the original level in Region A is directly related to the ventilation rate (ACH) in the space. There is a one-to-one correspondence between the normalized activity, $A_f(t)/A_f(t=\infty)$, at any time during the buildup as it approaches unity, to the air change rate in the space as shown by FIG. (1). The vertical lines in FIG. 4 show a read time interval of every 15 minutes, for a period to 2.5 hours after the completion of purge at time point 2. The total elapsed time from the beginning of the initial stationary count in Region A to the end of Region C at time point 31 is here illustrated to be 3 hours, 10 minutes. This provides, in Region C, 10 experimental time data points to compare to theory to obtain a statistically significant measure of ventilation rate.

Figure 5:
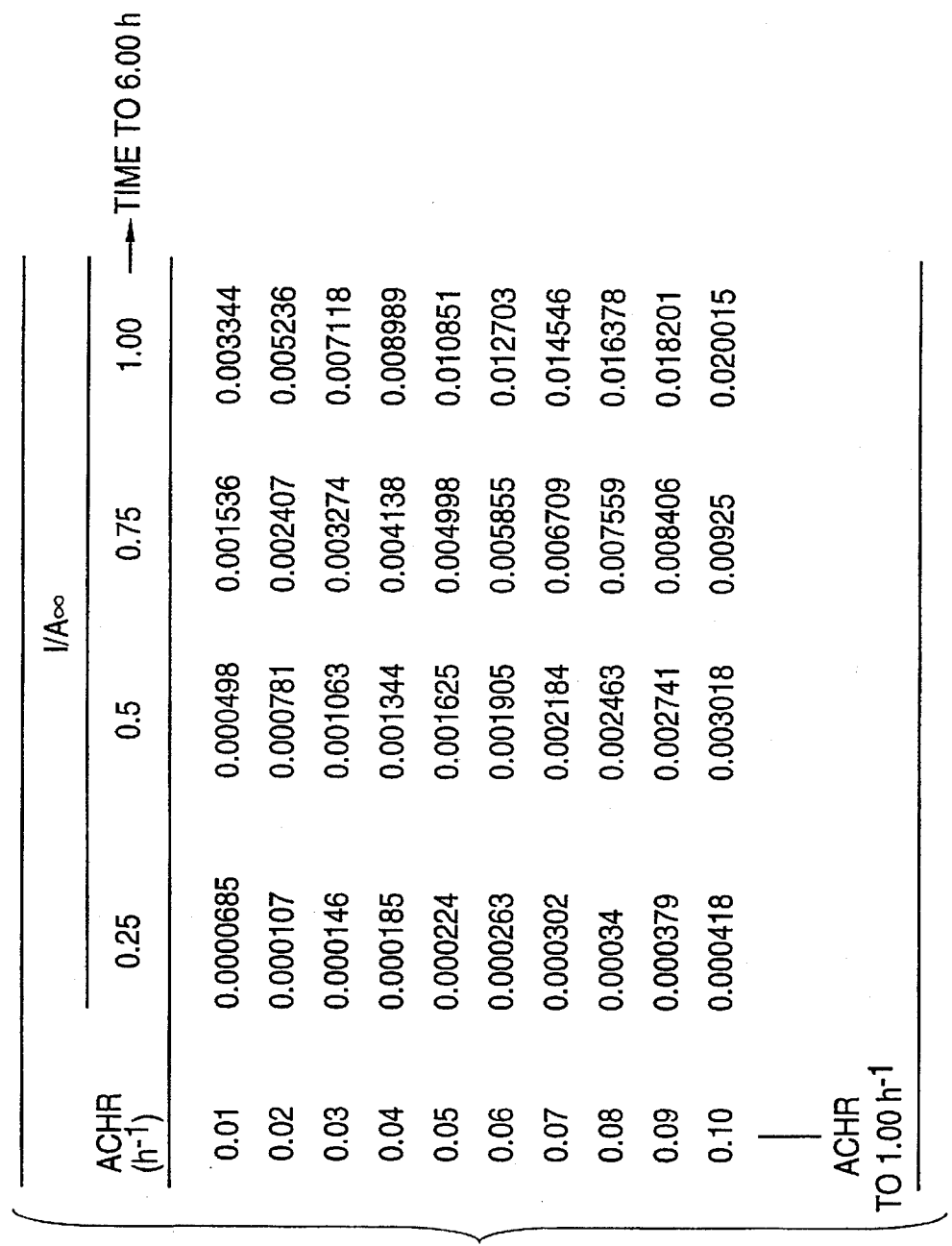
FIG. 5 illustrates an excerpt from a table relating ACH to normalized integral alpha count activity according to time

The normalized, time-dependent buildup is obtained by dividing the $A_f(t)$ acquired in Region A into the individual activity values acquired in Region C. To correlate experimental $A_f(t)/A_f(t=\infty)$ $I_f(t)/A_f(t=\infty)$ (integral) values with theoretical ventilation rate, a set of two dimensional tables are precomputed, as illustrated in FIG. 5. FIG. 5 provides integral values for times after purge from 0 to 5.0 hours at 0.25 h intervals, and for ACH values from 0 to 1.5 h at 0.01 h intervals. FIG. 5, provides excerpts from the integral table with each column representing the variation of the dependent variable $I_f(t)/A_f(t=\infty)$ with time for fixed ACH values. Each row of FIG. 5 therefore provides the variation of the dependent variable with ACH for fixed time after purge. By interpolation, for any accurate measured values of $A_f(t)$ or $I_f(t)$ and $A_f(t=\infty)$, ACH as predicted by theory may be determined from the table to + or − 0.002 $h^{-1}$.

It is noteworthy that since activity on the filter 100 of the detector unit 90 and counts rate shown on the LED display 50 of detector counter 90 differ only by the counting efficiency factor of the instrument, then Count Rate$(t)$/Count Rate$(t=\infty)=A_f(t)/A_f(t=\infty)$ and Integral Count$(t)$/Count Rate$(t=\infty)=I_f(t)/A_f(t=\infty)$ such that when normalized values are used, normalized Count Rate(t) and Integral Count(t) are synonymous with normalized $A_f(t)$ and $I_f(t)$.

Experimental Results

The inventor has applied the radon detection system and method of the invention to several experimental sites, and obtained very satisfactory results.

A. Test Chamber 1—Natural Source, Mechanical ACH

The inventor measured eight separate ACH values in Test Chamber 1 with a natural source emanation and virtually no natural ventilation (less than 0.005 $h^{-1}$ ambient natural air change rate, as determined by $SF_6$ tracer measurement). The chamber was an underground wine cellar, consisting of 30 cm thick concrete walls, ceiling and floor. The only opening was a 60 cm by 100 cm hatchway. Test chamber 1 is completely underground, with 1 meter of earth covering over the ceiling slab. From prior measurements it was known to have a high natural radon source level. A constant air exchange rate was induced mechanically with a box-type fan and plastic ducts. The eight different air change rates were established in the chamber and monitored by an anemometer at specific grid points across the face of the duct. The radon progenies detector used for these eight measurements was a Thomson-Nielson Radon "Sniffer", Model TN-WL-01 which detects alpha particles of the progenies collected on a filter with a ZnS detector.

The individual pulses generated by the alpha particles from Ra-A and Ra-C' collected on the filter were amplified and sent to a 4096 channel multichannel scaler, sampling time 1 minute per channel, Model Personal Computer Analyzer manufactured by necleus, Inc. Corporation of Oak Ridge, Tenn. Each channel provided total pulses acquired in each 1-minute time interval. Data was acquired for a minimum of 2.5 hours after purge. Both integral counts and count rate data were analyzed. For Run No. F-1 illustrated in FIGS. 6 and 7, the equilibrium count rate $A_f(t=\infty)$ obtained was 1456 counts per hour. For nine 0.25 h interval values (0.5 to 2.5 h) a value for ACH was computed from interpolation of the appropriate $A_f$-ACH tables (see FIG. 5) and for each data point a statistical standard deviation (S.D.) from the mean value of all nine values was obtained. The S.D. was computed for the set and given in FIG. 6, which provides results of the entire eight ACH measurements made with the mechanically induced ventilation in Test Chamber 1.

B. Test Camber 2—Constant Radon Source, Natural Building Ventilation Rates

The inventor has also carried out contrasting measurements using the system and method of the invention in a constant- radon source room on the upper floor of a building (confirmed natural radon level of less than 1.8 Bq m$^{-3}$) using an NIST-calibrated 37k Bq (1.0 µCi) Ra-226 source, as illustrated in FIG. 6. No forced (mechanical) ventilation was induced. In this series of measurements, the ACH was measured, simultaneous with the radon and progenies buildup time (Region C), using both the invention and the conventional SF$_6$ tracer gas method with an Ion Track Model SF$_6$ detector. The radon progenies detector used in this series was a Victoreen Alpha CAM filter airborne radioactivity detector (having much higher detection sensitivity). Values of ACH were obtained for each time data point after completion of purge. From these data, mean values for ACH by both methods were computed and a S.D. of each set of data was obtained (CAM S.D. and SF$_6$ S.D.). FIG. 6 (Part B) provides these data for the three measurements.

Knowing the room volume values for the source rate magnitudes were obtained through the relation S/V=C(t=∞) /Lambda, of 38.9 + or − 4.7, 38.1 + or − 8.4, and 34.8 + or − 4.3 k Bq for an average of 37.3 + or − 6.2 k Bq (1.00 + or − 0.16 µCi) as compared to the NIST-quoted value of 37.0 + or − 0.7 k Bq (1.00 + or − 0.02 µCi), an excellent agreement.

C. Residential Measurements

Figure 8:
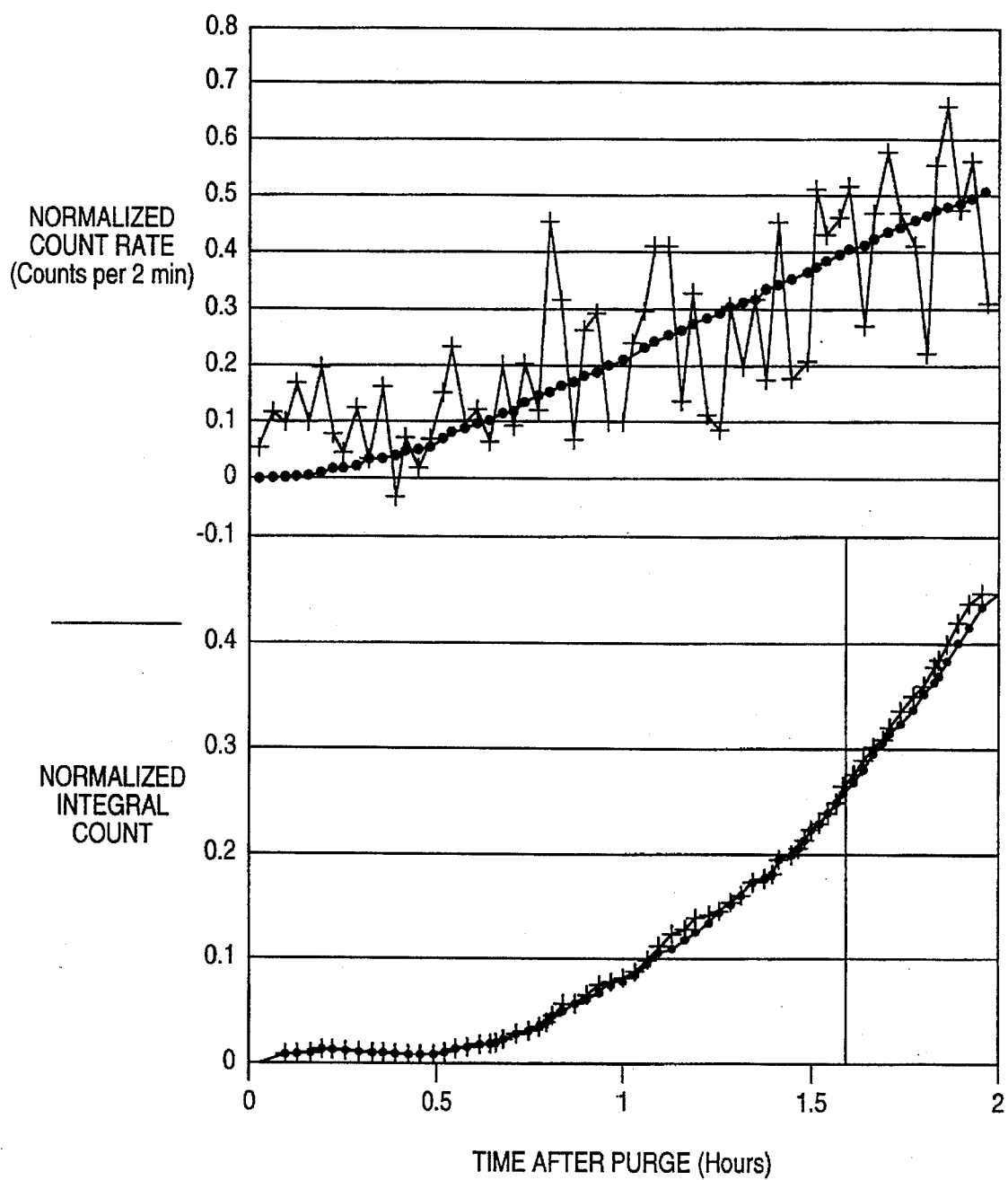
FIG. 8 also illustrates experimental results from applying the detection system and method of the invention to a specific residential test site.
Figure 9:
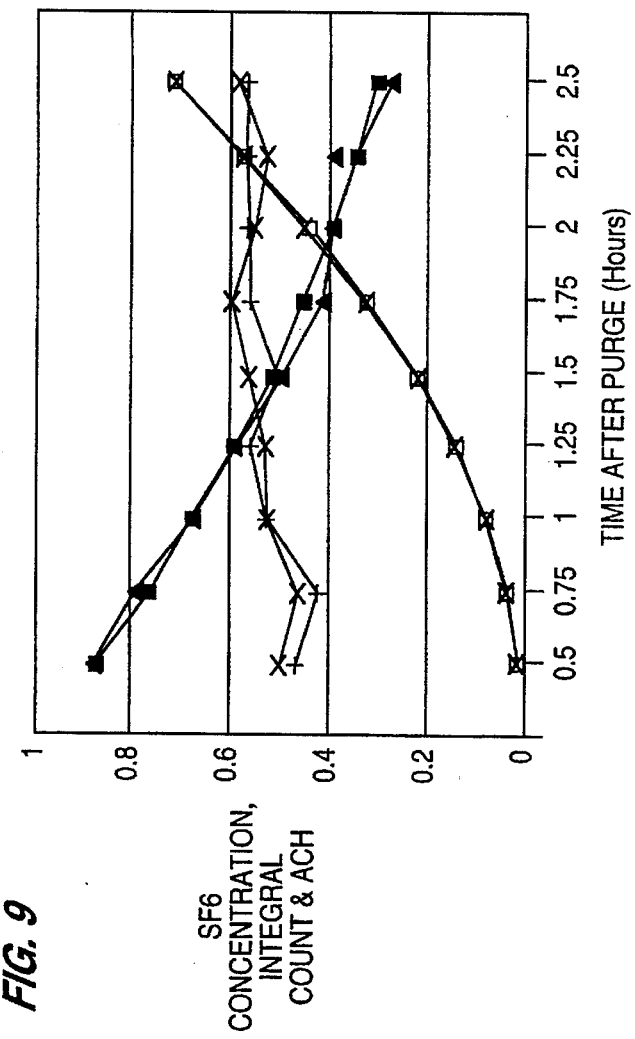
FIG. 9 illustrates a comparison of experimental results from applying the detection system and method of the invention and conventional $SF_6$ to residential test sites.
Figure 12A:
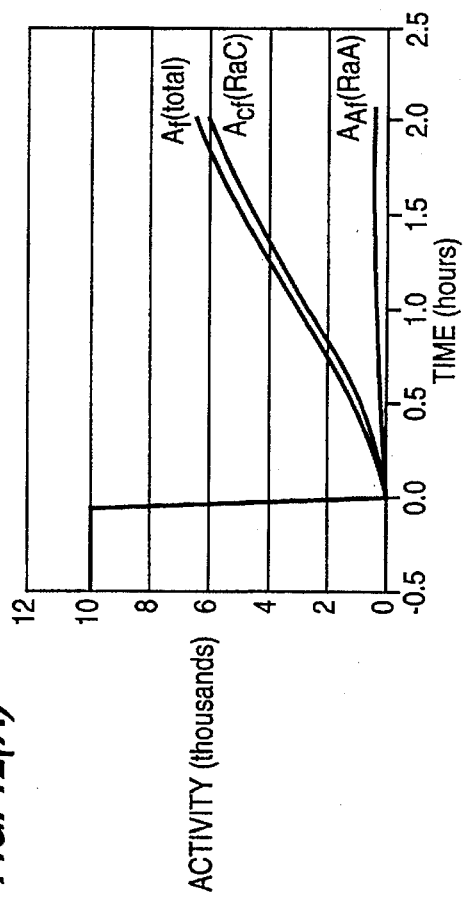
FIGS. 12(A)–12(E) illustrate count activity as a function of time after purge (period B), for an assumed $A_f(t=\infty)$ of 10,000 disintegrations/hour and ACH=1h$^{-1}$.

The inventor has likewise carried out a total of 17 ACH measurements in four single-family detached houses with basements (in Annapolis, Md.). Measurements were made in the basements with all air circulating systems shut off. In all of these measurements, simultaneous measurements of ACH were made by the SF$_6$ method and the invention method. The technique of computing the mean value and S.D. was used as described for Test Chamber 2 (B above). FIG. 6 (Parts C, D, E and F) show the results. For the four dwellings, a wide range of natural air change rates were observed, from 0.175 to 1.643 h$^{-1}$. FIGS. 8 and 9 illustrate the form of the acquired data (Run No. S-2). FIG. 8 shows experimental count rate (3a) and integral (3b) data and theoretical curves for radon progenies buildup for the mean value of ACH=0.531 h$^{-1}$. Counts were obtained each 2 minutes for these curves. FIG. 10 provides all data obtained for determination of ACH (Run No. 5-2), showing:

1) the experimental SF$_6$ decay curve and the theoretical assuming a pure exponential decreasing with the SF$_6$ mean value ACH=0.536 h$^{-1}$;

2) the experimental integral curve for the radon method buildup and the theoretical curve for the radon method mean value ACH=0.531 h$^{-1}$; and 3) the ACH values computed for each time data point for 0.5 to 2.5 h by the SF$_6$ and radon methods.

Figure 7A:
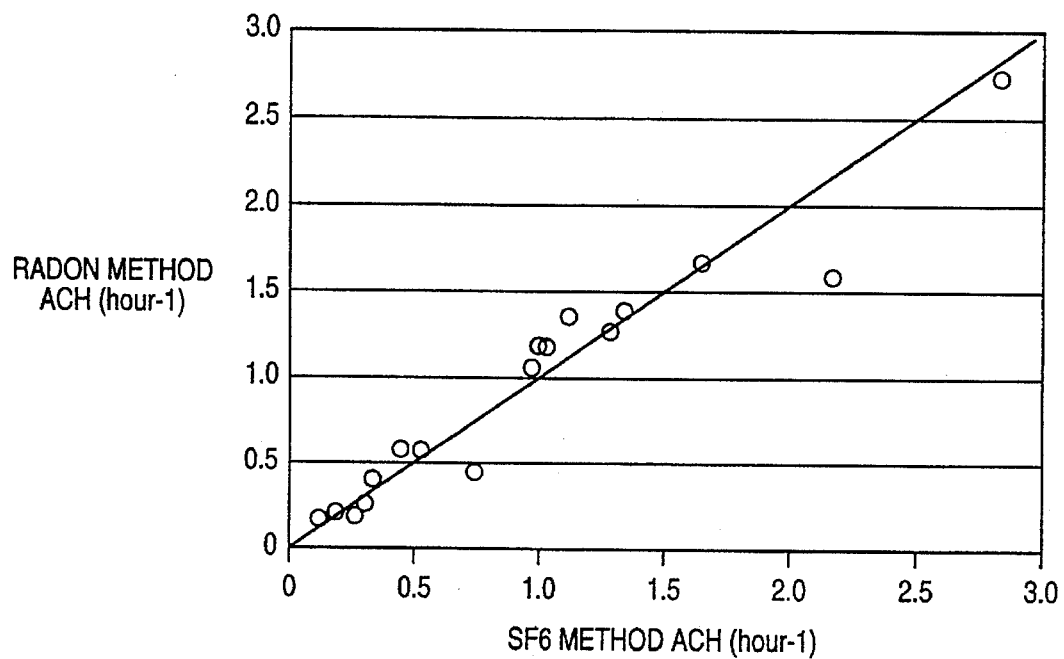
FIGS. 7(A) and 7(B) illustrate experimental results from applying the detection system and method of the invention to residential test sites.
Figure 7B:
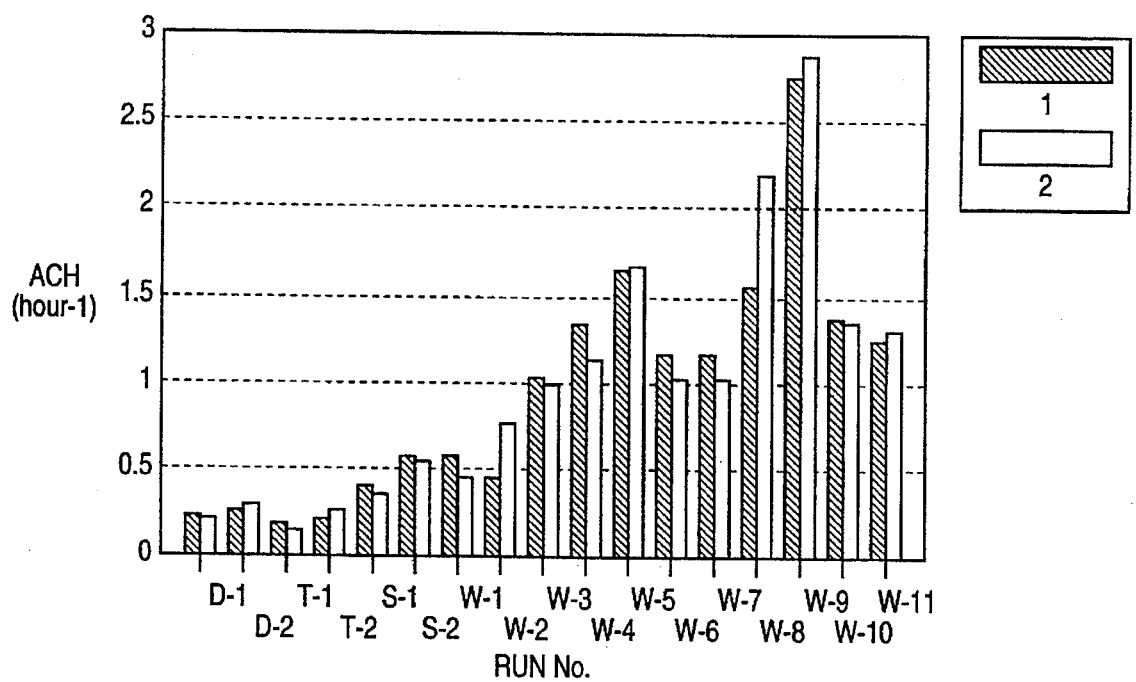

From these time data point values, shown by the markers, the mean values of ACH=0.536 and 0.531 h$^{-1}$, respectively, were computed with the % S.D.'s as given in FIG. 7 (Part E). This method was used to determine the ACH's and their % S.D. for all values in FIG. (Parts C, D, E and F).

During course of experiment described above, the inventor found that the first data point at 15 minutes after completion of purge was in many instances not statistically significant to be useful due to low accumulated counts on the detector. Integral count data provided the best results, statistically, as illustrated by FIGS. 8 and 9 (Run No. S-2). To minimize any imbalance in pressures between the source origin and the air space, it is therefore preferable to alternate the air flow during the purge period to provide a nearly equal time of influx and exhaust by reversing the purge fan direction. This tends to provide smoother results.

By performing deviation calculations at each 15 minute data point, it is possible to impose an acceptability or rejection criteria on the data. This is preferable as a check, since an assumption in the operation of the invention is that the radon and progenies source rate magnitudes and the removal rates (Lambdas) remain constant. Yet these can be affected by changes in temperature, pressure and/or wind speed and direction. In Test Chamber 1 for example for Runs Nos. F-1 through F-8, the Thomson-Nielson Radon Sniffer was adequate as a detector due to the high radon levels present in the room. The sensitivity of the instrument using a filter flow rate of 4 L min$^{-1}$ was approximately 60 counts per hour for a radon level of 37 Bq m$^{-3}$ (1 pi Ci/L). For the remaining experimental measurements at the other locations the inventor found it necessary to use a more sensitive detector, i.e., the Victoreen Alpha CAM, having a sensitivity of about 3,200 counts per hours for 37 Bq m$^{-3}$ with a flow rate of 18 L min$^{-1}$. Test Chamber 1 radon level was found to be mainly responsive to changes in barometric pressure rather than outside temperature, wind speed, or wind direction. A change in pressure results, with about a one hour time lag, in the corresponding change in radon level in the underground chamber. This was evidenced by correlations between the detector and an electronic barometer connected to a strip recorder.

A condition, that the theory provides a one-to-one correspondence between normalized activity and ACH, is that the source rate magnitude and ACH remain reasonably constant over the period of the measurement. With either the SF$_6$ or radon method, if the ACH varies, the measurement error can obviously occur. Variation of radon source rate magnitude is usually not of concern in the SF$_6$, but for the invention a concern is significant variations in radon levels that have been observed by many investigators in residences from diurnal and weather front fluctuations in barometric pressure, temperature and wind speed.

It is therefore highly preferably in carrying out the invention that the time between completion of the measurement of $A_f(t=\infty)$ and completion of the ACH sampling period be minimized. A 2.5 hour period was experimentally used and with 40 minutes for $A_f(t=\infty)$ measurement and purging of the space. Thus, 3.16 hours total data collection time was required. The inventor has however identified at least two aspects of the invention that lessen the effect of variation of source rate magnitude during the measurement runs, one being the dampening effect of the response lag time imposed by the time involved in collection and buildup of the activity on the filter, of the instantaneous airborne radon progenies fluctuations. The second is the use of integral counts, rather than count rate. For the latter, one may consider a ramp type change in source magnitude, i.e., let $S(t)=S_0(1+at)$ where $S_0$ is the source magnitude at $t=0$, $a$ is the rate of change in fraction per hour, and $t$ is time in hours. Then, $$A_f(t) \sim S(t) = S_0(1+at)$$

However the integral, as opposed to instantaneous value, would be $$I_f(t) = \int A_f(t')dt' \sim \int S(t')dt' \sim$$
$$\int S_0(1+at')dt' \sim$$
$$S_0(t+at^2/2) \sim$$
$$S_0 t(1+at/2)$$

The rate of change (or ramp) of the integral data is therefore $a/2$ or ½ of that for the count rate data. To examine this "source effect" factor, the inventor examined hourly fluctuations of radon activity on the filter in all four residential dwelling runs, for a total of 154 hours. From this data, changes in hourly activity over hypothetical sample intervals were computed, i.e., $$\frac{\text{Delta of } C}{C_0} = \frac{C_0 - C_i}{C_0}$$

where Co is the initial count rate to establish $A_f(t=\infty)$ and $C_i$ is the hourly count in the i-th subsequent hour of sampling time (1–5 hours). FIG. 11 illustrates data of % S.D. versus hypothetical sample time. For a 3-hour total sample period, the data shows a + or − 14.3% S.D. if count rate data is used and 7.2% S.D. for integral data.

To examine the efficacy of the smoothing effect of integral counts, the number of 3-hour runs (ACH measurements) that would be rejected for inaccuracy if a criteria is set for rejection of any run yielding greater than + or − 30% S.D. can be examined. From the 154 hours of data for 3 hour sampling, the delta of C/C₀ would exceed + or − 30%. S.D. 5 times, compared to 28 and 40 times for 4 and 5 hour sampling times, respectively.

It is worthwhile to point out that these fluctuations represent source change, ACH change and/or both and not just source change. The data indicate that sampling times of 3 hours is adequate to preferably minimize source rate magnitude level changes in the homes tested. Applying a similar criteria to the 17 actual residential measurements of ACH by the radon and $SF_6$ methods (C above), 3 radon method ACH runs and 4 $SF_6$ method ACH runs would be rejected by the + or − 30% S.D. rejection criteria, so that the detection system and method of the invention is in any event comparable to conventional techniques in this regard.

The effect of "plateout" (the preferential desposition of the negatively charged airborne radioactive radon and thoron progenies on surfaces of the closed space) was also able to be examined, using the equations set out in the Appendix since they allow plateout rate (PO) values to be added into the removal rate constants (Lambdas). A number of different values have been given in the literature for PO. All measurements were made with care not to have any air circulating, since a large effect on PO from enhanced air motion in residential environment is known, (see S. N. Rudnick and E. F. Maker, "Surface Deposition if $Rn^{222}$ decay Products with and without Enhanced Air Motion", Health Physics Journal, Vol. 51, No. 3, p. 283, 1986), though it is small without air motion. Rudnick and Maker provide separate PO values for two ACH values (0.23 and 0.52 $h^{-1}$) without air motion for Ra-A, Ra-B, and Ra-C. Computations were made using PO values of 2.6, 0.25, and 0.135 $h^{-1}$, respectively. The theory shows that in the time domain, during buildup after purging, the ratio of Ra-A to Ra-C/C' is greater at early times and since plateout is largest for Ra-A, the impact of plateout is greatest for the 0.5 hour data point (about 20%) but monotonically decreases with the effect being only about 4% for the 2.5 hour data point. The average between 0.5 and 2.5 hours from theory is 8.3%. The effect is reduced, even though the actual magnitude of the progenies concentrations are decreased significantly with respect to the radon concentration in the space, since the buildup equations are normalized to the stationary progenies value, $A_f(t=\infty)$ and not to the radon activity. Furthermore, with Ra-A providing a much minor role than Ra-C' in the value of $A_f(t=\infty)$, the impact is further lessened.

To carry out the controlled conditions of air purging followed by radon re-accumulation described above, detector system 30 as illustrated in FIG. 3 has a mode switching device 10 which allows an operator to select a mode of operation of the detector system 30, such modes appropriately corresponding to operations carried out in regions A, B and C, integral count, etc. Timer switching device 20 may be switched to allow the operator to select the time for the detector system 30 to operate in that mode. At any time, the operator may press a read button 40 and read an LED display 50 the instantaneous radiation concentration level, the time-averaged level for a desired period, and a graphical presentation of the time variation of the concentration level over the period.

Detector system 30 includes micro-computer 60, which has installed in its RAM 70 the radon equations shown below. Microcomputer 60 may for instance comprise a standard desktop or portable IBM-compatible PC. If microcomputer 60 comprises a PC, it may be interfaced to detector unit 90 by IEEE 488 bus or other suitable means. Microcomputer 60 may also be suitably reside in the chassis of detector unit 90 itself. Between micro-computer 60 and detector unit 90 are attached appropriate signal conditioning circuits, including preamplifier 130 and amplifier 140 to assure good signal levels. A pulse height analyzer 150 is also preferably interposed after amplifier 140, to output suitable digital data representing the alpha count activity to microcomputer 60. Micro-computer 60 may also drive a separate display 160 for purposes such as installing program code, backup monitoring, etc.

The following equations derived by the inventor allow computation of the theoretical time dependent variation of the concentration levels. (See B. Leonard, "Ventilation Rates by Measurement of Induced Time-Dependent Behavior-Theory, Application and Evaluation", 1992, incorporated here by reference). The equations are given as follows:

$$A_f(t) = A_{1af}(t) + A_{4af}(t) + A_{4af}(t) \quad \text{Equation 1}$$

$$A_{kaf}(t) = E_f V_f \{\Sigma_{n=1}^{k}[S_n/\text{Lambda}_k] \cdot [\pi_{i=n}^{k-1}\text{Lambda}_i/\text{Lambda}_j] \cdot [1+\Sigma_\beta \ _{n+1}^{k+1}(-1)^{k-\beta}h_{n/k+1,\beta}\text{Exp}(-\text{Lambda}_\beta t)]\} \quad \text{Equation 2}$$

$$A_{kaf}(t) = E_f V_f \{\Sigma_{n=1}^{k}[S_n/\text{Lambda}_j] \cdot [\pi_{i=n}^{j-1}\text{Lambda}_i/\text{Lambda}_j] \cdot [1+\Sigma_\beta \ _{n+1}^{k+1}(-1)^{k-\beta}h_{n/k+1,\beta}\text{Exp}(-\text{Lambda}_\beta t)]\} \quad \text{Equation 3}$$

$$A_{kaf}(t) = E_f V_f \{\Sigma_{n=1}^{k}[S_n/\text{Lambda}_j] \cdot [\pi_{i=n}^{j-1}\text{Lambda}_i/\text{Lambda}_j] \cdot [1+\Sigma_\beta \ _{n+1}^{k+1}(-1)^{k-\beta}h_{n/k+1,\beta}\text{Exp}(-\text{Lambda}_\beta t)]\} \quad \text{Equation 4}$$

The asymptotic (equilibrium, at t=∞) values of these equations are given as:

$$A_f(t=\infty)=A_{1\alpha f}(t=\infty)+A_{4\alpha f}(t=\infty)+A_{4gf}(t=\infty)$$ Equation 5

Equation 6

$$A_{k\alpha f}(t=\infty)=E_f V_f \Sigma_{n-1}{}^k [S_n/\text{Lambda}_k]\cdot[\pi_{i-n}{}^{k-1}\text{Lambda}_i/\text{Lambda}_j]$$ Equation 7

$$A_{kgf}(t=\infty)=E_f V_f \Sigma_{n-1}{}^k [S_n/\text{Lambda}_j]\cdot[\pi_{i-n}{}^{j-1}\text{Lambda}_i/\text{Lambda}_j]$$ Equation 8

$$A_{kgf}(t=\infty)=E_f V_f \Sigma_{n-1}{}^k [S_n/\text{Lambda}_j]\cdot[\pi_{i-n}{}^{j-1}\text{Lambda}_i/\text{Lambda}_j]$$

The detector system 30 preferably measures the concentration level for short periods, for example 2 minutes, and stores in RAM 70, and if desired fixed storage 120 (such as a hard drive), of micro-computer 60 the measured alpha particle events occurring on the detector unit 90 for each data point. From the measurements and data obtained in Regions A, B, C the micro-computer 60 computes $A_f(t=\infty)$ from Region A and, for each 2 minute data period in Region C, the experimentally measured $A_f(t)/A_f(t=\infty)$, that is, the alpha count activity normalized by a factor of the equilibrium value. Suitable software modules to carry out such computations will be readily implemented by persons skilled in the art; an example of such modules is given herein below.

These empirical values are then compared to the theoretical concentration levels during radon re-accumulation, as given by Equations 1 through 8. The theoretical relationship between the alpha particle detection rate and the ACH at selected particle detection rates may be numerically stored in the RAM 70 of the computer, for instance having been loaded in off of a floppy disk 80 or other permanent storage device.

The ventilation rate of the subject space may then be derived from the measured radon data. This is accomplished as follows. For each measured data point in Region C, a best fit value of empirical ACH to the theoretical table is calculated, by least squares or other suitable methods that will be understood by persons skilled in the art. FIG. 1, to illustrate, shows data points 15 minutes apart in Region C. The operator may select a desired range of data points, for instance from 2 minutes to 15 minutes, giving a total time period of Region C of 2 hours.

Figure 2A:
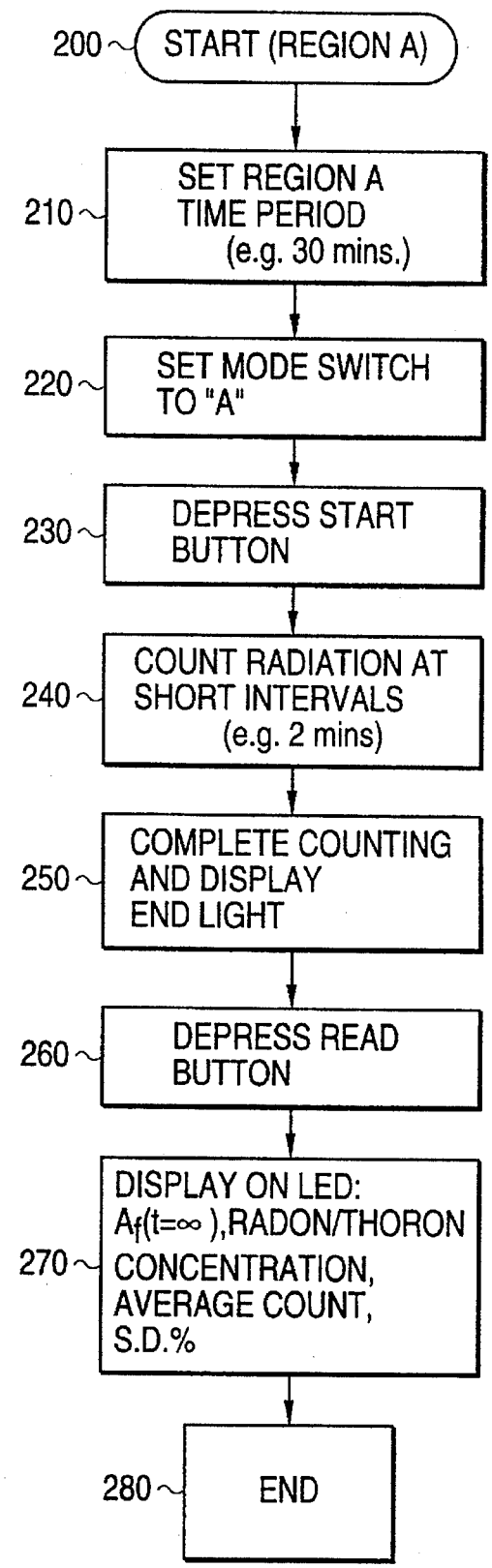
Figure 2C:
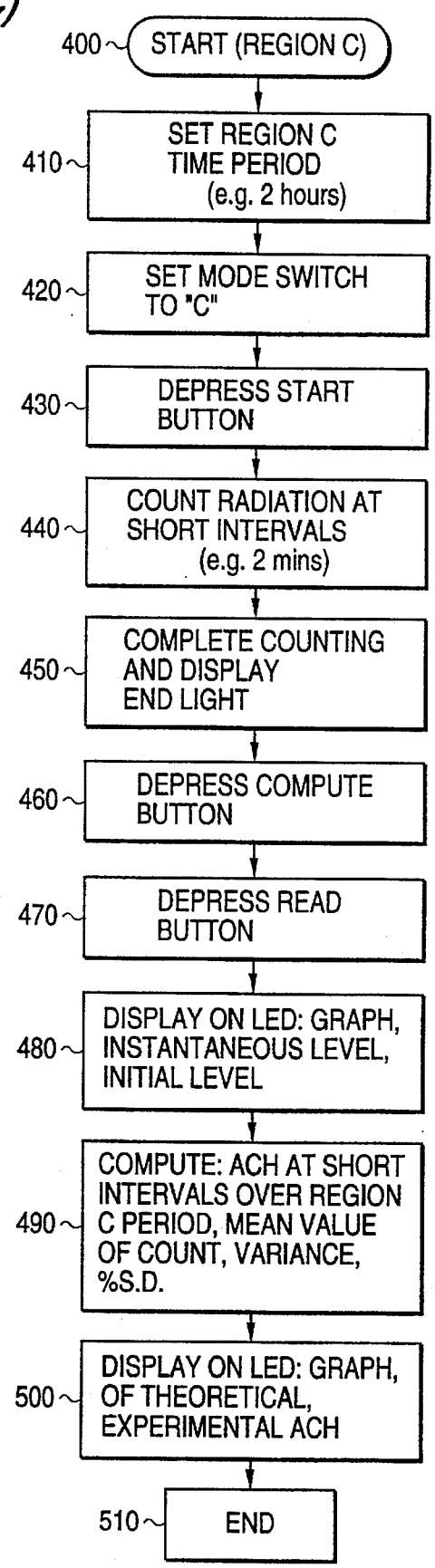

The measurement procedure proceeds according to the flowchart illustrated in FIG. 2. The detector system 30 may preferably be monitoring concentration for at least 4 hours prior to beginning Region A measurements.

From the complete set of data points and values of ACH derived according to the flowchart illustrated in FIG. 2, the micro-computer 60 calculates a mean value of ACH. This value is displayed on the LED display 50. The micro-computer 60 also preferably computes the variance of each measured ACH at each data point and the net % standard deviation of the set. These data are also displayed on the LED display 50.

From the value of $A_f(t=\infty)$ and ACH, the radiation source emanation rate magnitude value are also readily computed, and mat also be displayed with the corresponding % standard deviation on the LED display 50. Computation is by means of the relationship C~S/Lambda.

The accumulated concentration rates provided by detector unit 90 are of course subject to any experimental errors in the general purging process. In carrying out the radon method and system of the invention, a small amount of residual radon and progenies can unintentionally be left after the purging of Period A. In the time range between 0 and 0.5 h for instance, if abnormal count rates are observed above the low levels predicted by theory, residual activity would be unmistakably implied. This is because even for a ACH=1.5 $h^{-1}$, the normalized integral count would only be 0.017 at 0.4 h. For an alpha detection rate of 1107 count per hour (measured in Run No. S-2, FIGS. 7 and 8), this is equivalent to 19 integral counts at 0.4 h. 80 counts were actually registered experimentally. If we assume conservatively (using ACH=1.5 $h^{-1}$), that there is residual background in the data of 50 cph and subtract this from the raw measured data, then the reduced overall curve to 2.5 h time appears to fall between the theoretical curves for ACH=0.50 and 0.55 $h^{-1}$.

But examining again the time region 0–0.4 h, it is found that the experimental data is still considerably greater, since at t=0.4 h, the experimental curve is still about 15 counts above the theoretical ACH=0.55 $h^{-1}$ curve. To account for this discrepancy, an additional 15 cph may be subtracted, making a total background subtraction of 65 cph. This gives a good fit to ACH=0.531 $h^{-1}$ from 0–2.5 h, including the 0–0.4 h range. In other words, an educated adjustment of the measured alpha detection rate is made to account for residual radon concentration, in two stages. The first is preferably a 50 cph baseline, and the second is preferably tailored to the actual measured behavior during the early (less than 1 hour) region. By this iterative method (comparing measured count rates at early times with those physically possible as stipulated by theory from FIG. 5, an accurate determination can be made of any residual background that may be present in the data from insufficient purging, or re-suspension, or both. In Run No. 5-2, the residual background was only 6.0% of $A_f(t=\infty)$ but was accurately determined by the above method to about + or − 1%. The following is a printout of the text of a computer program suitably implementing in part the detection system and method of the invention.

In other words, an educated adjustment of the measured alpha detection rate is made to account for residual radon concentration, in two stages. The first is preferably a 50 cph baseline, and the second is preferably tailored to the actual measured behavior during the early (less than 1 hour) region. By this iterative method (comparing measured count rates at early times with those physically possible as stipulated by theory from Figure 5, an accurate determination can be made of any residual background that may be present in the data from insufficient purging, or re-suspension, or both. In Run No. 5-2, the residual background was only 6.0% of $A_f(t=\infty)$ but was accurately determined by the above method to about + or - 1%. The following is a printout of the text of a computer program suitably implementing in part the detection system and method of the invention.

```
1    ON ERROR GOTO 49000
2  ' 5-9-93 version           multispc      by A.C. Lucas
4  ' Copyright Victoreen 1993
10 ' This program receives data from a 758 alphaCAM
11 ' This version is specifically configured to analyze radon daughters
12 '    and thoron daughters using trends which may be used to
14 '    used to estimate the air ventilation rate.
50 KEY 1, "G"
52 KEY 9, "W"
54 KEY 8, "S"
1000 REM
1010 REM
1020 SP$ = "                                          initialize program settings
              "
1030 PKH = 100: SX = 2: sy = 150
1040 REV = 2.1: PI = 3.14159265#
1050 KEY OFF
1060 EN(1) = 8.78: EN(2) = 7.69: EN(3) = 6: EN(4) = 5.15: EN(5) = 4.76: EN(6) =
4.77: EN(7) = 4.4: EN(8) = 4.19: 'alpha ray reference energies ThC' RaC' RaA
1070 CHM = 192:   'calibration for energy at radium c'
1080 DIM dta(300), DRA(300), E(100), SPDX(4, 100), SPDS(4, 256)
1090 DIM EX(42), EX$(80), H$(40), PARRAY(1125)
1100 FOR i = 0 TO 42: READ EX(i), EX$(i): NEXT i: '    error tags
1110 AREA = 20: EFF = .46:  'planchet area, counting efficiency
1120 BR$ = "9600": CM$ = "com1": dd$ = "b": SN$ = "305": SCR = 9: yht = 360
1130 CLS : GOSUB 57000: GOSUB 3160: CLS : GOSUB 55200: GOSUB 1800
1140 PKH = 1: CLS : GOTO 30000
1800 SCREEN SCR: CLS : yht = 360: IF SCR = 2 THEN yht = 200
1810 sy = 150 * yht / 200: X0 = 30: Y0 = 30 * yht / 200
1820 RETURN
2000 RETURN
3000 LOCATE 10, 10: PRINT TAB(10); "0 to exit": '   Alter Konstants **********
3002 PRINT TAB(10); "1 data disk  = "; dd$
3010 PRINT TAB(10); "2 COMport is = "; CM$
3012 PRINT TAB(10); "3 Baud rate  = "; BR$
3014 PRINT TAB(10); "4 Cam S/N    = "; SN$
3016 PRINT TAB(10); "5 Efficiency ="; EFF
3018 PRINT TAB(10); "6 Sample Area="; AREA
3020 PRINT TAB(10); "7 Channel Cal="; CHM
3030 PRINT TAB(10); "8 screen     ="; SCR
3060 PRINT : PRINT TAB(8); "Which number?   "
3070 a$ = INKEY$: IF a$ = "" GOTO 3070
3090 IF VAL(a$) = 0 THEN CLS : RETURN
```

```
3100 U = VAL(a$): ON U GOSUB 3160, 3170, 3180, 3190, 3200, 3210, 3220, 3230
3110 CLS : GOTO 3000
3160 PRINT "Data disk e.g.,a,b,c     = ";
3162 a$ = INKEY$: IF a$ = "" GOTO 3162
3164 dd$ = a$: PRINT a$: RETURN
3170 INPUT "COMport e.g.,com1,com2  = "; CM$: RETURN
3180 INPUT "baud rate = "; BR$: RETURN
3190 INPUT "CAM Serial Number       = "; SN$: RETURN
3200 INPUT "Fractional efficiency   = "; EFF: RETURN
3210 INPUT "Sample Area             = "; AREA: RETURN
3220 INPUT "Channel for RaC         = "; CHM: RETURN
3230 INPUT "Screen 2 or 9           = "; SCR: GOSUB 1800: RETURN
3500 RETURN
4000 REM     recall ascii spectrum from disk and convert to #'s   **********
4010 INPUT "file name  "; na$
4020 OPEN dd$ + ":" + na$ + ".cam" FOR INPUT AS #2
4022 M = 0: n = 0: CH = 0
4030 v = EOF(2): IF v <> 0 THEN CLOSE 2: GOTO 4100
4035 INPUT #2, dta$: M = M + 1
4040 IF M < 5 THEN H$(M) = dta$: GOTO 4030:       ' 5 lines of text in file
4044 CH = VAL(LEFT$(dta$, 3)): U = LEN(STR$(CH)) - 1
4045 FOR i = 1 TO 8: dta(CH) = VAL(MID$(dta$, (i - 1) * 8 + U + 4, 7)): CH = CH + 1
4046 NEXT i
4060 GOTO 4030
4100 '
4110 CLOSE 2
4120 n = CH
4130 RETURN
4300 '     plot the spectrum
4310 IF linlog = 1 GOTO 4500
4340    x1 = 0: y1 = 0
4400 FOR i = 1 TO n
4404    x2 = SX * i
4406    y2 = dta(i) / PKH * sy
4408    IF y2 > yht - 10 THEN y2 = yht - Y0 - 1
4410    LINE (x1 + X0, yht - y1 - Y0)-(SX * i + X0, yht - y2 - Y0): REM   plot
4420    x1 = x2: y1 = y2
4430 NEXT i: GOSUB 37400
4499 RETURN
4500 '     plot the spectrum in 4 decade log
4540    x1 = 0: y1 = 0: L10 = LOG(10)
4600 FOR i = 1 TO n
4610 IF dta(i) < 1 THEN y2 = 0: GOTO 4660
4620    y2 = (LOG(dta(i)) * 10 + 10 * L10) * yht / 200
4622    IF y2 > yht - Y0 THEN y2 = yht - Y0
4660    LINE (x1 + X0, yht - y1 - Y0)-(SX * i + X0, yht - y2 - Y0): REM    plot
4670    x1 = SX * i: y1 = y2
4680 NEXT i: GOSUB 4900
4699 RETURN
4800 PKH = 1:         '     general peak height finding routine   **********
4802 FOR i = 2 TO n
4810 IF dta(i) > PKH THEN PKH = dta(i)
4820 NEXT i
4890 RETURN
4900 FOR i = 0 TO 5
4910 LINE (SX * 50 * i + X0, yht - 10 - Y0)-(SX * 50 * i + X0, yht - Y0)
4920 NEXT i
4922 LINE (X0, yht - Y0)-(600, yht - Y0)
4924 LINE (X0, yht - Y0)-(X0, 30)
4926 FOR i = 0 TO 6
4927 LINE (X0, yht - Y0 - 10 * L10 * i * yht / 200)-(X0 + 10, yht - Y0 - 10 * L10 * i * yht / 200)
4928 NEXT i
4930 LOCATE 4, 1: PRINT "1e5"
4932 LOCATE 7, 1: PRINT "1e4"
4934 LOCATE 10, 1: PRINT "1e3"
4936 LOCATE 13, 1: PRINT "100"
4938 LOCATE 16, 1: PRINT " 10"
4940 LOCATE 19, 1: PRINT "  1"
```

```
4950  LOCATE 23, 4
4960  PRINT "   0         50        100       150       200       250"
4962  LOCATE 2, 1
4999  RETURN
5000  M = 1: T$ = "": ' transfer ascii data from CAM and save as lines **********
5001  DUMP$ = ">id" + SN$ + " 1" + CHR$(13)
5002  au$ = DATE$: GOSUB 20000
5003  na$ = h4$ + LEFT$(TIME$, 2) + MID$(TIME$, 4, 2)
5010  LOCATE 2, 1: PRINT "writing file "; na$
5018     IF dreg = 2 OR flagspec = 1 THEN GOTO 5030
5020     OPEN dd$ + ":" + na$ + ".cam" FOR OUTPUT AS #2: 'disk file
5030     OPEN CM$ + ":" + BR$ + ",n,8,1,DS,CS,RS" FOR RANDOM AS #1:     'comm file
5032  PRINT #1, DUMP$
5050  IF LOC(1) < 1 THEN GOTO 5090
5060     F$ = INPUT$(1, #1)
5065  IF ASC(F$) = 0 THEN GOSUB 5100: CLOSE 1: CLOSE 2: n = CH: GOSUB 4800: GOSU
   4300:  RETURN
5066  'subs are:
5067  '       5100     record last line
5068  '       4800     find peak height
5069  '       4300     plot the spectrum
5070  '       9704     set lower level and count time
5071  '       9120     calculate ul, sums, sample parameters
5075     IF F$ = CHR$(13) THEN GOTO 5050
5080     IF F$ = CHR$(10) THEN GOSUB 5100: GOTO 5050
5082     T$ = T$ + F$
5090  GOTO 5050
5100  IF LEN(T$) < 3 THEN T$ = "": RETURN
5110     IF dreg = 2 OR flagspec = 1 ,GOTO 5130
5120     PRINT #2, T$:                          ' record a line of data
5130     IF M < 5 THEN H$(M) = T$: GOTO 5180:   ' 4 lines of text in file
5140     CH = VAL(LEFT$(T$, 6)): U = LEN(STR$(CH)) - 1
5150  FOR i = 1 TO 8: dta(CH) = VAL(MID$(T$, (i - 1) * 8 + 10, 7)): CH = CH + 1
5160  NEXT i
5180     T$ = "": M = M + 1
5190  RETURN
5400  linlog = 1:                      'multiscaler spectrum transfer ********
5410  INPUT "minutes per region count  "; minutes
5412  INPUT "minutes per spectrum      "; minspec
5420  INPUT "number of region counts   "; nspec
5422  PRINT "Save     ?"
5424  PRINT TAB(5); "1 spectrum only"
5426  PRINT TAB(5); "2 regions only "
5428  PRINT TAB(5); "3 both"
5430  INPUT dreg:                                 dreg indexes save
5432  IF dreg < 2 GOTO 5440
5434  au$ = DATE$: GOSUB 20000: na$ = h4$ + LEFT$(TIME$, 2) + MID$(TIME$, 4, 2)
5436  OPEN dd$ + ":" + na$ + ".rgn" FOR OUTPUT AS #3: 'region file
5440  PRINT "Press any key to start"
5450  a$ = INKEY$: IF a$ = "" GOTO 5450
5452  CLS
5454  au$ = DATE$: GOSUB 20000
5460  ac = TIMER + h2 * 24 * 3600: NZ = 1: ns = 1
5470  au$ = DATE$: GOSUB 20000
5472  LOCATE 1, 1: PRINT "Touch 'x' to escape to menu"
5474  aw$ = INKEY$: IF aw$ = "x" THEN CLOSE 3: dreg = 0: RETURN
5476  IF TIMER + h2 * 24 * 3600 - ac > ns * minspec * 60 THEN flagspec = 0: ns =
 ns + 1: GOTO 5478
5477        flagspec = 1
5478  IF TIMER + h2 * 24 * 3600 - ac < NZ * minutes * 60 GOTO 5470:  '    wait he
re for next ******
5480  GOSUB 5000:  ' get the spectrum
5481  IF dreg < 2 GOTO 5483
5482  GOSUB 32000: GOSUB 5600: ' calculate and save the regions
5483  LOCATE 4, 65: PRINT NZ; " done"
5490  NZ = NZ + 1: IF NZ > nspec THEN CLOSE 3: dreg = 0: RETURN
5500  GOTO 5470
5600  PRINT #3, TIME$; CHR$(13); :   'save the region data on file
5601  LOCATE 6, 65
5602  FOR i = 1 TO 4: sa(i) = 0
5604  FOR j = ll(i) TO ul(i): sa(i) = sa(i) + dta(j): NEXT j
5605  PRINT #3, sa(i); CHR$(13);
5606  NEXT i
5607  LOCATE 6, 65: PRINT "1 "; sa(1): LOCATE 7, 65: PRINT "2 "; sa(2)
5608  LOCATE 8, 65: PRINT "3 "; sa(3): LOCATE 9, 65: PRINT "4 "; sa(4)
5609  LOCATE 10, 65: PRINT minutes; " min each"
5610  LOCATE 11, 65: PRINT nspec; " regions"
5690  RETURN 5900                                             : 'set regions (4) **************
```

```
5902 LOCATE 11, 2: PRINT "Set 4 regions"
5904 FOR i = 1 TO 4: PRINT i; "ll= "; ll(i); : INPUT x
5905              IF x <> 0 THEN ll(i) = x
5906              PRINT i; "ul= "; ul(i); : INPUT x
                 IF x <> 0 THEN ul(i) = x
5908 NEXT i
5910 RETURN 6000 REM    subtract a spectrum from disk from the spectrum in memory   *********
6012 CLS : LOCATE 2, 1
6020 PRINT "0 exit this routine"
6021 PRINT "1 load bkg spectrum"
6022 PRINT "2 graph both spectra"
6023 PRINT "3 scale bkg"
6024 PRINT "4 swap spectra "
6025 PRINT "5 smooth spectra"
6026 PRINT "6 difference ":            Main spectrum - bkg
6027 PRINT "* mult. bkg by 1.1 "
6028 PRINT "/ mult. bkg by 0.9 "
6030 a$ = INKEY$: IF a$ = "" GOTO 6030
6031 DN = VAL(a$)
6032 IF a$ = "*" THEN MU = 1.1: GOSUB 6310: GOSUB 6200: GOTO 6020
6034 IF a$ = "/" THEN MU = .9: GOSUB 6310: GOSUB 6200: GOTO 6020
6039 IF DN = 0 THEN CLS : RETURN
6040 ON DN GOSUB 6100, 6200, 6300, 6900, 6400, 6500
6050 GOTO 6020
6100 CLS : GOSUB 6900: GOSUB 4000: GOSUB 6900: RETURN: REM load a spectrum
6200 CLS : GOSUB 4300:                              : REM graph both spectra
6210 GOSUB 6900: GOSUB 4300: GOSUB 6900
6220 RETURN
6300 CLS : INPUT "Multiply bkg spectrum by "; MU: REM scale bkg
6310 FOR i = 1 TO n: DRA(i) = DRA(i) * MU: NEXT i
6320 RETURN
6400 INPUT "smooth how many channels?   "; CH: REM    smooth data
6410 INPUT "starting with which channel "; CI
6420 CLS : GOSUB 35004: GOSUB 6900: GOSUB 35004: GOSUB 6900
6430 RETURN
6500 FOR i = 1 TO n: dta(i) = dta(i) - DRA(i): NEXT i: REM  difference spectrum
6510 CLS : GOSUB 4300
6599 RETURN
6900 FOR i = 1 TO n: REM swap spectra
6910 R = DRA(i): DRA(i) = dta(i): dta(i) = R
6920 NEXT i: RETURN
9000 'Find the thick sample specific activity assuming uranium    **************
9005 ENX = EN(8)
9010 GOSUB 9700
9026 ul = EN(8) / EN(2) * CHM + 10
9030 GOSUB 9600
9040 RETURN
9100 'Find the thick sample specific activity assuming plutonium  **************
9105 ENX = EN(4)
9110 GOSUB 9700
9120 ul = EN(4) / EN(2) * CHM + 10
9130 GOSUB 9600
9140 RETURN
9200 'Find the thick sample specific activity assuming thorium    **************
9202 '  there are 7 decays averaging 5.99 Mev/decay
9205 ENX = 5.99
9210 GOSUB 9700
9220 ul = EN(1) / EN(2) * CHM + 10
9230 GOSUB 9600
9240 RETURN
9600 REM    GOSUB 9800
9610 FOR i = ll TO ul:             sum to U/Pu  energy+10 ch
9612 SUMA = SUMA + dta(i) * SPDS(4, i):    assume quartz
9620 NEXT i
```

```
9622 GOSUB 6900
9630 SUMA = SUMA / ENX / CT / AREA / EFF:          'bequerels/gm
9632 ACTU = SUMA / 3.7E+10:                         'curies/gm
9634 PRINT SUMA; TAB(16); "bq/gm"
9636 PRINT ACTU; TAB(16); "ci/gm"
9650 RETURN
9700 PRINT "sample area, sqcm "; AREA; : 'set the counting parameters
9701 INPUT x: IF x <> 0 THEN AREA = x
9702 PRINT "counter eff, frac "; EFF;
9703 INPUT x: IF x <> 0 THEN EFF = x
9704 PRINT "lowest channel    "; ll;
9705 INPUT x: IF x <> 0 THEN ll = x
9706 PRINT "counting time,sec "; CT;
9707 INPUT x: IF x <> 0 THEN CT = x
9708 RETURN
9800 'Strip high energy stuff from under uranium or plutonium
9802 FOR i = 1 TO n: DRA(i) = dta(i): NEXT i: 'copy the spectrum
9804 FOR i = ll TO ul
9806 dta(i) = DRA(i) - DRA(ul) * SPDS(4, ul) / SPDS(4, i)
9808 NEXT i
9810 RETURN
10000 REM  analyze for specific nuclides                        ************
10010 CLS : LOCATE 3, 1
10020 PRINT TAB(5); "Uranium"
10030 PRINT TAB(5); "Plutonium"
10040 PRINT TAB(5); "Thorium"
10050 PRINT TAB(5); "Find peaks"
10060 PRINT : PRINT : PRINT
10100 a$ = INKEY$: IF a$ = "" GOTO 10100
10110 IF a$ = "u" THEN GOSUB 9000: RETURN
10130 IF a$ = "p" THEN GOSUB 9100: RETURN
10140 IF a$ = "f" THEN GOSUB 12000: RETURN
10150 IF a$ = "t" THEN GOSUB 9200: RETURN
10999 RETURN
11000 CLS : FILES dd$ + ":*.cam": REM      print the directory of .CAM files ****
11010      FILES dd$ + ":*.rgn"
11100 a$ = INKEY$: IF a$ = "" GOTO 11100
11110 CLS
11120 RETURN
12000 REM differentiate the spectrum to find the energy peaks    ************
12100 FOR i = n TO 10 STEP -1
12110 dta(i) = dta(i - 1) - dta(i)
12120 NEXT i
12130 GOSUB 4300
12999 RETURN
20000 REM       unpack date    input is au$  output is h4 or h4$
20010 FOR H9 = 1 TO 8
20020 H$ = MID$(au$, H9, 1)
20030 IF H$ = "/" OR H$ = "-" THEN GOTO 20050
20040 NEXT H9
20050 h1$ = MID$(au$, 1, H9 - 1)
20060 FOR H8 = H9 + 1 TO 8
20070 H$ = MID$(au$, H8, 1)
20080 IF H$ = "/" OR H$ = "-" THEN GOTO 20100
20090 NEXT H8
20100 h2$ = MID$(au$, H9 + 1, H8 - H9 - 1)
20110 H3$ = MID$(au$, H8 + 1, LEN(au$) - H8)
20120 h1 = VAL(h1$): h2 = VAL(h2$): H3 = VAL(H3$): IF H3 < 100 THEN H3 = H3 + 1900
20130 IF h1 < 3 THEN GOTO 20160
20140 h1 = h1 + 1
20150 GOTO 20180
20160 h1 = h1 + 13
20170 H3 = H3 - 1
20180 h4 = h2 + INT(365.25 * H3) + INT(30.5 * h1) - 7276401
```

```
20190 REM    IF H4<0 THEN H4=0
20200 h4$ = RIGHT$(STR$(h4), LEN(STR$(h4)) - 1)
20300 RETURN
30000                    'This is the touch menu     *************************
30010 GOSUB 30500: REM    This is the touch menu     ************************
*
30030 a$ = INKEY$: IF a$ = "" GOTO 30030
30090 IF a$ = "r" THEN GOSUB 34000: GOTO 30000
30100 IF a$ = "p" THEN GOSUB 31000: GOTO 30000
30110 IF a$ = "t" THEN GOSUB 32000: GOTO 30000
30120 IF a$ = "c" THEN CLS :         GOTO 30000
30130 IF a$ = "l" THEN GOSUB 33000: GOTO 30000
30140 IF a$ = "k" THEN GOSUB 3000:  GOTO 30000
30150 IF a$ = "s" THEN GOSUB 35000: GOTO 30000
30160 IF a$ = "n" THEN GOSUB 36000: GOTO 30000
30170 IF a$ = "d" THEN GOSUB 6000:  GOTO 30000
30180 IF a$ = "e" THEN GOSUB 37000: GOTO 30000
30188 IF a$ = "z" THEN GOSUB 10000: GOTO 30000
30190 IF a$ = "G" THEN GOSUB 5000:  GOTO 30000
30200 IF a$ = "f" THEN GOSUB 11000: GOTO 30000
30210 IF a$ = "x" THEN GOTO 55000
30220 IF a$ = "a" THEN GOSUB 39000: GOTO 30000
30230 IF a$ = "h" THEN GOSUB 40000: GOTO 30000
30240 IF a$ = "y" THEN GOSUB 56000: GOTO 30000
30250 IF a$ = "W" THEN GOSUB 5400:   GOTO 30000
30260 IF a$ = "S" THEN GOSUB 5900:   GOTO 30000
30499 GOTO 30000
30500 'This is the top line menu for temporary use in display and calculation'
30510 LOCATE 1, 1: PRINT SP$
30520 LOCATE 1, 1: PRINT "F1 CAM   Total Peak Region Clear Load Znuclide  N
ormalize Difference"
30530 LOCATE 2, 65: PRINT "Energies"
30540 LOCATE 3, 65: PRINT "Header"
30550 LOCATE 4, 65: PRINT "Analog"
30560 LOCATE 5, 65: PRINT "Files"
30580 LOCATE 6, 65: PRINT "Konstants"
30590 LOCATE 7, 65: PRINT "Smooth"
30592 LOCATE 8, 65: PRINT "Y prtscrn"
30594 LOCATE 9, 65: PRINT "F9 multispc"
30596 LOCATE 10, 65: PRINT "F8 set region"
30599 RETURN
30999 GOTO 30000
31000 PK = 0: CP = 0: REM                       find the PEAK    **********
31002 FOR i = 1 TO n: IF PK < dta(i) THEN PK = dta(i): CP = i
31010 NEXT i
31012 LOCATE 2, 1: PRINT LEFT$(SP$, 35): PRINT LEFT$(SP$, 35)
31020 LOCATE 2, 1: PRINT "peak value= "; PK: : PRINT "peak channel= "; CP
31030 RETURN
32000 sa = 0: FOR i = 1 TO n: sa = sa + dta(i): NEXT i: REM   TOTAL   *********
32010 LOCATE 2, 1: PRINT LEFT$(SP$, 35): PRINT LEFT$(SP$, 35)
32020 LOCATE 2, 1: PRINT "total # = "; sa
32030 RETURN
33000 CLS : LOCATE 2, 1: PRINT "1 spectrum"
33010                    PRINT "2 regions"
33020                    INPUT dm: ON dm GOSUB 33200, 33100: RETURN
33100 INPUT "filename$"; na$
33102 INPUT "full scale counts"; fsc
33104 CLS : x1 = 0: FOR i = 1 TO 4: cs(i) = 0: NEXT i: 'initial values
33110 OPEN dd$ + ":" + na$ + ".rgn" FOR INPUT AS #2
33120 v = EOF(2): IF v <> 0 THEN CLOSE 2: LOCATE 1, 1:  RETURN
33130 INPUT #2, a$: 'time of day
33140 FOR i = 1 TO 4
33142     INPUT #2, cr(i)
33144     NEXT i
33150 FOR i = 1 TO 4: y2 = yht - (cr(i) - cs(i)) / fsc * sy * yht / 200
```

```
33152      IF x1 > 639 GOTO 33160
33154      IF y2 < 0 GOTO 33160
33156      LINE (x1, y1(i))-(x1 + .5, y2)
33158         y1(i) = y2: cs(i) = cr(i)
33160 NEXT i: x1 = x1 + .5
33170 GOTO 33120
33200 GOSUB 4000: GOSUB 4800: GOSUB 4300: REM     load a spectrum
33210 RETURN
34000 '                get the sum in a REGION of interest              ***********
34010 LOCATE 2, 1: PRINT LEFT$(SP$, 35): PRINT LEFT$(SP$, 35)
34020 LOCATE 2, 1: INPUT "channel1,channel2"; ll, ul
34030 sa = 0: FOR i = ll TO ul: sa = sa + dta(i): NEXT i
34040 PRINT "sum=    "; sa
34050 LINE (SX * ll, 110)-(SX * ll, 90), 6
34060 LINE (SX * ul, 110)-(SX * ul, 90), 6
34070 RETURN
35000 INPUT "smooth how many channels?   "; CH: REM     SMOOTH data  ***********
35001 INPUT "starting with which channel "; CI
35004 x1 = 0: y1 = 0
35100 FOR i = INT(CH / 2) + CI + 1 TO n - INT(CH / 2) - 1: '  Boxcar Smoothing
35110 sa = 0
35120 FOR j = i - INT(CH / 2) TO i + INT(CH / 2)
35130 sa = sa + dta(j)
35140 NEXT j
35141 dta(i) = sa / (2 * INT(CH / 2) + 1)
35145 NEXT i
35150 GOSUB 4300
35190 RETURN
36000 CLS : REM             clear replot and NORMALIZE to peak    ***********
36002     INPUT "normalize from what channel"; CH
36010 PKH = 0: FOR i = CH TO n: IF PKH < dta(i) THEN PKH = dta(i)
36020 NEXT i
36030 GOSUB 4300
36070 RETURN
37000 'highlight the nuclides on the spectrum at ENERGIES          ***********
37002 x1 = 150: y1 = 20
37010 LOCATE 4, 1
37020 PRINT "Thorium C´   8.78"
37030 PRINT "Radium C´    7.69"
37040 PRINT "Radium A     6.00"
37050 PRINT "Plut    239  5.15"
37060 PRINT "Uranium 234  4.76"
37070 PRINT "Radium  226  4.77"
37080 PRINT "Uranium 235  4.40"
37090 PRINT "Uranium 238  4.19"
37200 FOR i = 1 TO 8
37205 Y = yht / 200 * (y1 + 8 * i)
37210 LINE (x1, Y)-(SX * CHM * EN(i) / EN(2), Y)
37220 NEXT i
37300 FOR i = 1 TO 8
37305 Y = yht / 200 * (y1 + 8 * i)
37310 LINE (SX * CHM * EN(i) / EN(2), Y)-(SX * CHM * EN(i) / EN(2), yht / 2)
37320 NEXT i
37400 FOR EN = 0 TO 5
37410 LINE (SX * 50 * EN + X0, yht - Y0)-(SX * 50 * EN + X0, yht - Y0 - 10)
37420 NEXT EN
37430 LOCATE 23, 4
37440 PRINT " 0         50        100        150       200         250"
37442 LOCATE 2, 1
37450 LINE (X0, yht - Y0)-(600, yht - Y0)
37999 RETURN
39000 REM   toggle from LINEAR to LOG plot and do scales   on crt   ***********
39005 LOCATE 8, 1
39010 PRINT "linear   0 "
39020 PRINT "log      1 "
39030 a$ = INKEY$: IF a$ = "" GOTO 39030
```

```
39032 IF a$ = "2" THEN GOTO 39200
39040 linlog = VAL(a$)
39050 LOCATE 8, 1: PRINT "                    "
39060 LOCATE 9, 1: PRINT "                    "
39062 LOCATE 10, 1: PRINT "                    "
39099 RETURN
39200 FOR i = 1 TO 6: L(i) = 10 * (i - 1) + 1: NEXT i
39210 FOR i = 1 TO 6: H(i) = 10 * i: NEXT i: H(6) = 240
39220 FOR i = 1 TO 6
39230 sa = 0
39240 FOR j = L(i) TO H(i)
39250 sa = sa + dta(j)
39260 NEXT j
39270 PRINT i, sa
39280 NEXT i
39999 RETURN
40000 CLS : FOR i = 1 TO 14: PRINT H$(i): NEXT i: 'look at the HEADER        *******
*****
40010 a$ = INKEY$: IF a$ = "" GOTO 40010
40020 CLS : RETURN
40413 DATA 13,"type mismatch"
49000                 REM     find the error descriptor
49002 LOCATE 3, 1: Y = ERL: x = ERR: PRINT x; Y;
49010 FOR i = 0 TO 40: IF EX(i) = x THEN PRINT EX$(i)
49020 NEXT i
49030 IF x = 55 THEN CLOSE : PRINT "all files closed": PRINT "try again"
49100 RESUME 30010
50000                                           Error Library    ************
50401 DATA 1 ,"NEXT without FOR"
50402 DATA 2 ,"syntax error"
50403 DATA 3 ,"RETURN without GOSUB"
50404 DATA 4 ,"out of data"
50405 DATA 5 ,"illegal function call"
50406 DATA 6 ,"overflow"
50407 DATA 7 ,"out of memory"
50408 DATA 8 ,"undefined line number"
50409 DATA 9 ,"subscript out of range"
50412 DATA 12,"illegal direct"
50413 DATA 13,"type mismatch"
50414 DATA 14,"out of string space"
50415 DATA 15,"string too long"
50416 DATA 16,"string formula too complex
50417 DATA 17,"can't continue"
50418 DATA 18,"undefined user function"
50419 DATA 19,"no RESUME"
50420 DATA 20,"RESUME without error"
50422 DATA 22,"missing operand"
50423 DATA 23,"line buffer overflow"
50424 DATA 24,"device timeout"
50425 DATA 25,"device fault"
50427 DATA 27,"out of paper"
50429 DATA 29,"WHILE without WEND"
50430 DATA 30,"WEND without WHILE"
50451 DATA 51,"internal error"
50452 DATA 52,"bad file number"
50453 DATA 53,"bad file name"
50454 DATA 54,"bad file mode"
50455 DATA 55,"file already open"
50457 DATA 57,"device i/o error"
50461 DATA 61,"disk full"
50462 DATA 62,"input past end"
50463 DATA 63,"bad record number"
50466 DATA 66,"direct statement in file"
50467 DATA 67,"too many files"
50468 DATA 68,"device unavailable"
50469 DATA 69,"communication buffer overflow"
```

```
50470 DATA 70,"disk write protect"
50471 DATA 71,"disk not ready"
50472 DATA 72,"disk media error"
50473 DATA 73,"advanced feature"  : '          Error Library   *********
*
50474 DATA 74,"rename across disks"
50475 DATA 75,"path/file access error"
50476 DATA 76,"path not found"
50555 DATA 55,"file already open"
55000 '              '      exit and copy constants of setup to disk   ************
55010 OPEN dd$ + ":alphaset" FOR OUTPUT AS #3:  '  disk file
55020 PRINT #3, dd$; CHR$(13); : '      disk drive for data
55030 PRINT #3, BR$; CHR$(13); : '      baud rate for cam
55040 PRINT #3, CM$; CHR$(13); : '      com port (com1 or com2)
55050 PRINT #3, SN$; CHR$(13); : '      serial number of cam
55060 PRINT #3, AREA; CHR$(13); : '     area of sample on planchet
55070 PRINT #3, EFF; CHR$(13); : '      efficiency of counting
55080 PRINT #3, CHM; CHR$(13); : '      channel for radium c'=7.69 Mev
55090 PRINT #3, SCR; CHR$(13); : '      screen 2 or 9
55092 FOR i = 1 TO 4: PRINT #3, ll(i); CHR$(13); : PRINT #3, ul(i); CHR$(13); :
NEXT i
55100 CLOSE 3
55110 KEY 1, "LIST ": KEY 8, "tron": KEY 9, "key": KEY ON: CLS : SCREEN 0
55120 END
55200 '              copy constants for setup from data disk    ************
55210 OPEN dd$ + ":alphaset" FOR INPUT AS #3:  '  disk file
55220 INPUT #3, AA$:        '   disk drive for data
55230 INPUT #3, BR$:        '   baud rate for cam
55240 INPUT #3, CM$:        '   com port (com1 or com2)
55250 INPUT #3, SN$:        '   serial number of cam
55260 INPUT #3, AREA:       '   area of sample on planchet
55270 INPUT #3, EFF:        '   efficiency of counting
55280 INPUT #3, CHM:        '   channel for radium c'=7.69 Mev
55290 INPUT #3, SCR:        '   screen 2 or 9
55292 FOR i = 1 TO 4: INPUT #3, ll(i), ul(i): NEXT i
55300 CLOSE 3
55310 RETURN
56000 GOSUB 56170: GOSUB 56180: 'print screen routine
56030 YCNT = 0: XXW = 639:   'screen width in pixels
56040 FOR y1 = 0 TO yht - 8 STEP 8: FOR x1 = 0 TO XXW
56050 IF POINT(x1, y1) > 0 THEN a = 128 ELSE a = 0
56060 IF POINT(x1, y1 + 1) > 0 THEN B = 64 ELSE B = 0
56070 IF POINT(x1, y1 + 2) > 0 THEN C = 32 ELSE C = 0
56080 IF POINT(x1, y1 + 3) > 0 THEN D = 16 ELSE D = 0
56090 IF POINT(x1, y1 + 4) > 0 THEN E = 8 ELSE E = 0
56100 IF POINT(x1, y1 + 5) > 0 THEN F = 4 ELSE F = 0
56110 IF POINT(x1, y1 + 6) > 0 THEN G = 2 ELSE G = 0
56120 IF POINT(x1, y1 + 7) > 0 THEN H = 1 ELSE H = 0
56130 PARRAY(x1) = a + B + C + D + E + F + G + H
56140 K$ = INKEY$: IF K$ = CHR$(27) THEN SYSTEM: 'exit scan routine
56150 NEXT x1: GOSUB 56220: GOSUB 56170: NEXT y1: GOSUB 56300: GOSUB 56500
56160 RETURN
56170 FOR XX = 0 TO XXW: PARRAY(XX) = 0: NEXT XX: RETURN:  ' initialize array
56180 'printer initialize
56200 LPRINT CHR$(27); CHR$(51); CHR$(20): REM epson 20/216 inch line feed
56210 RETURN
56220 DTS = XXW + 1: N1 = DTS MOD 256: N2 = INT(DTS / 256): 'print screen array
56222 LPRINT SPC(10);
56230 K$ = INKEY$: IF K$ = CHR$(27) THEN SYSTEM
56240 LPRINT CHR$(27); "L"; CHR$(N1); CHR$(N2); : '    120 dots/in or 960 dots/l
ine
56250 FOR x = 0 TO DTS - 1: LPRINT CHR$(INT(PARRAY(x))); : NEXT x: LPRINT : RETU
RN
56300 LPRINT CHR$(27); CHR$(50): REM epson 1/6   inch line feed
56310 RETURN
56500  FOR i = 1 TO 4: LPRINT : NEXT i:      (print the HEADER    **********
```

```
56510  FOR i = 1 TO 14: LPRINT H$(i): LPRINT : NEXT i
56520  LPRINT CHR$(12)
56530  RETURN
57000  II = 30: LOCATE 1, 1: '    Put the header on the initial screen
57010  PRINT TAB(II); "   SANDAL "
57012  PRINT TAB(II); "     by   "
57014  PRINT TAB(II); "  Victoreen"
57020  PRINT TAB(II); "Copyright 1992"
57030  PRINT
57040  PRINT TAB(II); "Arthur C. Lucas"
57050  PRINT : PRINT : PRINT : PRINT
57080  RETURN
```

The foregoing description is illustrative in nature, and variations on aspects of the detection system and method of the invention will occur to persons skilled in the art. The invention is accordingly intended to be limited in scope only by the following claims.

I claim:

1. A system for determining the ventilation rate of a closed space by monitoring re-accumulation of a radioactive gas after purging the closed space, comprising:

purging means for causing substantially all of the radioactive gas to be expelled from the closed space;

radiation detection means for monitoring and storing radiation concentration levels of the radioactive gas at times before purging of the space by said purging means, during the purging by said purging means, and after the purging by said purging means;

ventilation determination means for determining a rate of ventilation in the closed space by establishing a correspondence between the radiation concentration levels monitored by said radiation detection means and the ventilation rate of the space.

2. A system for determining the ventilation rate of a closed space according to claim 1, wherein said radiation detection means further comprises:

a filter for capturing alpha particle radiation;

a sensing device for sensing the amount of alpha particle radiation on said filter; and a storage and control unit for storing the amount of alpha particle radiation sensed by said sensing device.

3. A system for determining the ventilation rate of a closed space according to claim 1, wherein said ventilation determination means further comprises:

an input unit, operatively connected to said radiation detection means and said ventilation determination means, and receiving the concentration levels detected by said radiation detection means; and a storage unit, storing precomputed tables relating radiation concentration levels to ventilation rate; and a compute unit, operatively connected to said input unit and said storage unit, and computing the ventilation rate of the closed space by comparing the radiation concentration levels detected by said radiation detection means to the precomputed tables and iteratively increasing or decreasing the radiation concentration levels detected by said radiation detection means until a predetermined minimum deviation from the tables is reached.

4. A system for determining the ventilation rate of a closed space according to claim 1, wherein the radioactive gas is radon.

5. A system for determining the ventilation rate of a closed space according to claim 1, wherein the radioactive gas is thoron.

6. A method for determining the ventilation rate of a closed space by monitoring re-accumulation of a radioactive gas after purging the closed space, comprising the steps of:

(a) Measuring an equilibrium value of concentration of radioactive gas in the closed space;

(b) Purging substantially all of the radioactive gas from the closed space;

(c) Measuring successive values of concentration of the radioactive gas in the closed space as it re-accumulates after said purging in step (b); and (d) Computing the ventilation rate of the closed space by establishing a correspondence between the successive values measured in step (c) and precomputed tables relating radiation concentration levels to ventilation rate.

7. A method for determining the ventilation rate of a closed space according to claim 6, wherein said computing in step (d) comprises the substeps of:

(d1) storing the successive concentration values measured in step (c); and (d2) iteratively increasing or decreasing the concentration levels measured in step (c) until a predetermined minimum deviation from the tables is reached.

8. A method for determining the ventilation rate of a closed space according to claim 6, further comprising the step of:

(e) Normalizing the successive concentration values measured in step (c) by dividing them by the equilibrium value measured in step (a).

* * * * *